US011257218B2

(12) United States Patent
Eade et al.

(10) Patent No.: US 11,257,218 B2
(45) Date of Patent: *Feb. 22, 2022

(54) RELATIVE ATLAS FOR AUTONOMOUS VEHICLE AND GENERATION THEREOF

(71) Applicant: Aurora Innovation, Inc., Palo Alto, CA (US)

(72) Inventors: Ethan Eade, Pittsburgh, PA (US); Michael Bode, Pittsburgh, PA (US)

(73) Assignee: Aurora Operations, Inc., Mountain View, CA (US)

(*) Notice: Subject to any disclaimer, the term of this patent is extended or adjusted under 35 U.S.C. 154(b) by 111 days.

This patent is subject to a terminal disclaimer.

(21) Appl. No.: 16/705,862

(22) Filed: Dec. 6, 2019

(65) Prior Publication Data

US 2020/0111216 A1    Apr. 9, 2020

Related U.S. Application Data

(63) Continuation of application No. 15/940,516, filed on Mar. 29, 2018, now Pat. No. 10,521,913.

(51) Int. Cl.
*G01C 21/32* (2006.01)
*G06T 7/12* (2017.01)
(Continued)

(52) U.S. Cl.
CPC ............... *G06T 7/12* (2017.01); *G01C 21/00* (2013.01); *G01C 21/20* (2013.01); *G01C 21/32* (2013.01); *G06F 16/284* (2019.01); *G06F 16/29* (2019.01); *G06T 7/162* (2017.01); *G06T 2207/20128* (2013.01)

(58) Field of Classification Search
CPC ........... G06T 7/12; G06T 7/168; G01C 21/30; G01C 21/32; G01C 21/36; G05D 1/00; G05D 1/0274; G06F 16/29
See application file for complete search history.

(56) References Cited

U.S. PATENT DOCUMENTS 8,559,673 B2   10/2013   Fairfield
8,620,032 B2   12/2013   Zeng
(Continued)

FOREIGN PATENT DOCUMENTS

DE   102011082379   3/2013
EP       2491344    8/2012
(Continued)

OTHER PUBLICATIONS

Karam Shaya "A Self-localization System with Global Error Reduction and Online Map-Building Capabilities" Oct. 2012 (Year: 2012).*
(Continued)

*Primary Examiner* — Yuri Kan
(74) *Attorney, Agent, or Firm* — Middleton Reutlinger

(57) ABSTRACT

A relative atlas graph is generated to store mapping data used by an autonomous vehicle. The relative atlas graph may be generated for a geographical area based on observations collected from the geographical area, and may include element nodes corresponding to elements detected from the observations along with edges that connect pairs of element nodes and define relative poses between the elements for connected pairs of element nodes.

20 Claims, 18 Drawing Sheets

(51) Int. Cl.

| | | |
|---|---|---|
| *G08G 1/00* | (2006.01) | |
| *G06T 7/162* | (2017.01) | |
| *G06F 16/28* | (2019.01) | |
| *G06F 16/29* | (2019.01) | |
| *G01C 21/00* | (2006.01) | |
| *G01C 21/20* | (2006.01) | |

(56) References Cited

U.S. PATENT DOCUMENTS

| | | | | |
|---|---|---|---|---|
| 9,145,140 | B2 | 9/2015 | Ferguson | |
| 10,474,699 | B2* | 11/2019 | Eade | G06F 16/284 |
| 10,503,760 | B2* | 12/2019 | Eade | G05D 1/0278 |
| 10,521,913 | B2* | 12/2019 | Eade | G01C 21/32 |
| 10,621,913 | B2 | 4/2020 | Eade et al. | |
| 2008/0243378 | A1 | 10/2008 | Zavoli | |
| 2013/0166206 | A1* | 6/2013 | Sato | G01C 21/3629 |
| | | | | 701/533 |
| 2014/0005933 | A1* | 1/2014 | Fong | G05D 1/0274 |
| | | | | 701/447 |
| 2015/0057871 | A1 | 2/2015 | Yukihiko et al. | |
| 2016/0143500 | A1 | 5/2016 | Fong | |
| 2017/0023947 | A1 | 1/2017 | McMillion | |
| 2017/0052032 | A1* | 2/2017 | Miksa | G01C 21/28 |
| 2017/0239813 | A1 | 8/2017 | Vicenti | |
| 2017/0329332 | A1* | 11/2017 | Pilarski | B60W 50/0097 |
| 2017/0363430 | A1* | 12/2017 | Al-Dahle | G01C 21/32 |
| 2017/0365165 | A1 | 12/2017 | Landfors | |
| 2017/0371348 | A1 | 12/2017 | Mou | |
| 2018/0045519 | A1 | 2/2018 | Vaibhav et al. | |
| 2018/0188040 | A1 | 7/2018 | Chen | |
| 2018/0188042 | A1 | 7/2018 | Chen | |
| 2018/0188043 | A1 | 7/2018 | Chen | |
| 2018/0216944 | A1* | 8/2018 | Mielenz | B60W 30/0956 |
| 2018/0307236 | A1 | 10/2018 | Reed | |
| 2019/0303392 | A1 | 10/2019 | Eade et al. | |
| 2019/0303457 | A1 | 10/2019 | Eade et al. | |
| 2019/0304097 | A1 | 10/2019 | Eade et al. | |
| 2020/0026722 | A1* | 1/2020 | Eade | G06T 7/168 |
| 2020/0110766 | A1* | 4/2020 | Eade | G05D 1/021 |
| 2020/0111216 | A1* | 4/2020 | Eade | G01C 21/00 |

FOREIGN PATENT DOCUMENTS

| | | |
|---|---|---|
| WO | WO2019191287 A1 | 10/2019 |
| WO | WO2019191292 A1 | 10/2019 |

OTHER PUBLICATIONS

Michael Bosse "An Atlas Framework for Scalable Mapping" Sep. 2003 (Year: 2003).*
Karam Shaya "A Self-localization System with Global Error Reduction and Online Map-Building Capabilities" Oct. 2012 (Year: 2012) (Year: 2012).*
United States Patent and Trademark Office, Notice of Allowance for U.S. Appl. No. 15/940,516 dated Sep. 4, 2019.
United States Patent and Trademark Office, Corrected Notice of Allowance for U.S. Appl. No. 15/940,516 dated Nov. 5, 2019.
United States Patent and Trademark Office, Notice of Allowance for U.S. Appl. No. 15/940,525 dated Aug. 21, 2019.
United States Patent and Trademark Office, Corrected Notice of Allowance for U.S. Appl. No. 15/940,525 dated Oct. 21, 2019.
International Searching Authority; International Search Report and Written Opinion for PCT Application No. PCT/US2019/024372, 16 pages; dated Sep. 10, 2019.
United States Patent and Trademark Office, Notice of Allowance for U.S. Appl. No. 16/271,612 dated Oct. 1, 2019.
The International Bureau of WIPO, International Preliminary Report on Patentability in PCT/US2019/024372 dated Sep. 29, 2020.
The International Bureau of WIPO, International Preliminary Report on Patentability in PCT/US2019/024363 dated Sep. 29, 2020.
Chinese Patent App. No. 201980023047.0 entered national stage Sep. 28, 2020.
Korean Patent App. No. 10-2020-7031075 entered national stage Oct. 28, 2020.
Bosse, et al. "An Atlas Framework for Scalable Mapping" International Conference on Robotics and Automation. Sep. 2003.
International Searching Authority; Invitation to Pay Additonal Fees and Partial International Search for PCT Application No. PCT/US2019/024372; 12 pages; dated Jul. 12, 2019.
Shaya et al.; A Self-localization System with Global Error Reduction and Online Map-Building Capabilities; Intelligent Robotics and Applications;; Berlin; 11 pages; dated Oct. 3, 2012.
International Searching Authority; International Search Report and Written Opinion for PCT Application No. PCT/US2019/024363, 23 pages; dated Aug. 7, 2019.
United States Patent and Trademark Office, Office Action for U.S. Appl. No. 16/271,612 dated Apr. 2, 2019.
United States Patent and Trademark Office, Notice of Allowance for U.S. Appl. No. 16/271,612 dated Aug. 14, 2019.
United States Patent and Trademark Office, Office Action for U.S. Appl. No. 16/705,887 dated Jun. 3, 2021.
United States Patent and Trademark Office, Office Action for U.S. Appl. No. 16/586,025 dated Jun. 24, 2021.
United States Patent and Trademark Office, Notice of Allowance in U.S. Appl. No. 16/705,887 dated Sep. 1, 2021.
United States Patent and Trademark Office, Notice of Allowance in U.S. Appl. No. 16/586,025 dated Nov. 15, 2021.

* cited by examiner

RELATIVE ATLAS FOR AUTONOMOUS VEHICLE AND GENERATION THEREOF

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relates to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

SUMMARY

The present disclosure is directed in part to the generation of a relative atlas graph to store mapping data used in the control of an autonomous vehicle. The relative atlas graph may be generated for a geographical area based on observations collected from the geographical area, and may include element nodes corresponding to elements detected from the observations along with edges that connect pairs of element nodes and define relative poses between the elements for connected pairs of element nodes.

Therefore, consistent with one aspect of the invention, a method of generating mapping data for use by an autonomous vehicle may include receiving a plurality of observations for a geographical area, and generating a relative atlas graph for the geographical area based on the plurality of observations for the geographical area. Generating the relative atlas graph may include generating a plurality of element nodes for a plurality of elements detected from the plurality of observations, each element node having an associated element from among the plurality of elements, generating a plurality of edges, each edge connecting a pair of element nodes from among the plurality of element nodes and defining a relative pose between the associated elements for the pair of element nodes, and storing the plurality of element nodes and the plurality of edges in the relative atlas graph.

In some implementations, each edge includes a transformation field defining the relative pose between the associated elements of the connected pair of element nodes. Also, in some implementations, storing the plurality of element nodes and the plurality of edges in the relative atlas graph includes storing the plurality of element nodes as records in a node table and storing the plurality of edges as records in an edge table.

Further, in some implementations, the node table and the edge table are maintained in a relational database.

In some implementations, each of the plurality of element nodes includes an identifier field including an identifier for the associated element thereof, and each of the plurality of edges includes first and second identifier fields including identifiers for the associated elements for the pair of element nodes connected thereby. In addition, in some implementations, each of the plurality of element nodes includes a type field specifying a type that characterizes the respective element node, and each of the plurality of edges includes a type field specifying a type that characterizes the respective edge.

In some implementations, each of the plurality of element nodes includes a payload field including element-specific data, and each of the plurality of edges includes a payload field including edge-specific data. In addition, in some implementations, the element-specific data in the payload field for a first element node among the plurality of nodes is structured based upon the type specified in the type field of the first element node, and the edge-specific data in the payload field for a first edge among the plurality of edges is structured based upon the type specified in the type field of the first edge.

Moreover, in some implementations, generating the relative atlas graph further includes generating a plurality of tile nodes for the geographical area, each tile node representing a region of the geographical area, and generating a second plurality of edges, each edge in the second plurality of edges connecting an element node from among the plurality of element nodes to a tile node from among the plurality of tile nodes and defining a relative pose of the associated element for the connected element node within a frame of reference for the connected tile node.

In some implementations, the second plurality of edges includes first and second edges, the first edge connecting a first element node among the plurality of element nodes to a first tile node among the plurality of tile nodes and defining a relative pose of the associated element for the first element node within the frame of reference for the first tile node, and the second edge connecting the first element node to a second tile node among the plurality of tile nodes and defining a relative pose of the associated element for the first element node within the frame of reference for the second tile node. Some implementations may also include generating a tile-and-tile edge connecting the first and second tile nodes and defining a relative pose between the first and second tiles.

Some implementations may further include generating a fixed reference node defining a fixed reference point, and generating first and second fixed reference edges respectively connecting the first and second tile nodes to the fixed reference node and respectively defining relative poses between the first and second tiles and the fixed reference point. In some implementations, the fixed reference point is an Earth Centered Earth Fixed (ECEF) reference point. In addition, in some implementations, the plurality of element nodes are not directly connected by edges to the fixed reference node such that no relative poses are defined between the plurality of elements and the fixed reference point.

Some implementations may also include storing in the first tile node geometry data defining a surface model for at least a portion of the region of the geographical area represented by the first tile node. Moreover, in some implementations, the plurality of element nodes includes a plurality of gate nodes, each gate node defining a gate representing a permissible vehicle pose within a geographical area. Also, in some implementations, generating the plurality of element nodes includes generating the plurality of gate nodes based upon one or more traversed paths in one or more vehicle logs collected by one or more vehicles traversing the geographical area.

In some implementations, the plurality of edges includes a plurality of gate-and-gate edges connecting pairs of gate nodes among the plurality of gate nodes, each gate-and-gate edge defining a permissible vehicle path between a pair of gates defined by the respective pair of gate nodes. In addition, in some implementations, a first gate-and-gate edge among the plurality of gate-and-gate edges connects first and second gate nodes among the plurality of gate nodes that represent a same lane of a roadway. Also, in some implementations, a first gate-and-gate edge among the plurality of gate-and-gate edges connects first and second gate nodes among the plurality of gate nodes that represent different lanes of one or more roadways.

Moreover, in some implementations, the plurality of element nodes further includes a plurality of boundary nodes, each boundary node defining a physical or virtual boundary that restricts vehicle movement within a geographical area. Further, in some implementations, generating the plurality of element nodes includes generating the plurality of boundary nodes based upon observations in one or more vehicle logs collected by one or more vehicles traversing the geographical area. Also, in some implementations, the plurality of edges further includes a plurality of boundary-and-boundary edges connecting pairs of boundary nodes among the plurality of boundary nodes, each boundary-and-boundary edge defining a relative pose between a pair of boundaries defined by the respective pair of boundary nodes. Further, in some implementations, the plurality of edges further includes a plurality of boundary-and-gate edges, each connecting a gate node from among the plurality of gate nodes with a boundary node from among the plurality of boundary nodes and defining a relative pose between a gate and boundary respectively defined by the gate node and boundary node connected thereby.

In some implementations, the plurality of nodes includes a plurality of traffic nodes, each traffic node associated with a traffic control within a geographical area. Also, in some implementations, generating the plurality of element nodes includes generating the plurality of traffic nodes based upon observations in one or more vehicle logs collected by one or more vehicles traversing the geographical area. In some implementations, generating the plurality of traffic nodes includes generating bounding boxes bounding traffic devices detected in images of the geographical area, triangulating positions of traffic devices bounded by the bounding boxes within the geographical area, and storing relative poses corresponding to the triangulated positions of the traffic devices in edges connected to one or more traffic nodes.

Further, in some implementations, the plurality of traffic nodes includes a control node defining a traffic control for a regulated geographical area, a plurality of traffic device nodes, each traffic device node defining a traffic device in the regulated geographical area, and a plurality of passage nodes defining passages through the regulated geographical area, and the plurality of edges includes traffic-device-and-control edges connecting the plurality of traffic device nodes to the control node and control-and-passage edges connecting the plurality of passage nodes to the control node. In some implementations, the plurality of edges further includes traffic-device-and-tile edges connecting traffic device nodes from among the plurality of traffic device nodes to one or more tile nodes from among the plurality of nodes and respectively defining relative poses between traffic devices defined by respective traffic nodes and one or more tiles defined by the respective one or more tile nodes. Further, in some implementations, the plurality of edges further includes passage-and-gate edges connecting passage nodes from among the plurality of passage nodes to one or more gate nodes from among the plurality of element nodes to define gates that are controlled by the traffic control.

In addition, some implementations may further include merging the generated relative atlas graph with another relative atlas graph for a second geographical area. In addition, some implementations may also include detecting a first element in the geographical area based on one or more observations among the plurality of observations, determining that a first element node among the plurality of element nodes is for the first element, and modifying a relative pose defined by a first edge connecting the first element node to a second element node for a second element based on one or more observations among the plurality of observations to reposition the first element relative to the second element. In some implementations, the second element node is connected to a third element node for a third element by a second edge, and modifying the relative pose defined by the first edge is performed without modifying a relative pose defined by the second edge such that modifying the relative pose defined by the first edge repositions the first element relative to the third element without modifying the relative pose defined by the second edge.

Some implementations may also include collecting the plurality of observations within one or more autonomous vehicles. In addition, in some implementations, generating the relative atlas graph is performed by an autonomous vehicle. Also, in some implementations, generating the relative atlas graph is performed by a computer system that is remote from and in communication with one or more autonomous vehicles. In addition, some implementations may also include deploying at least a portion of the relative atlas graph to at least one of the one or more autonomous vehicles over a wireless communication network.

Some implementations may also include modifying the relative atlas graph in response to one or more observations, and propagating one or more changes in the modified relative atlas graph to one or more of the plurality of autonomous vehicles.

Some implementations may further include importing external data into the relative atlas graph by converting the external data to a fixed frame of reference, identifying one or more tile nodes in the relative atlas graph that respectively define one or more tiles proximate the external data in the fixed frame of reference, projecting the external data into a frame of reference for each of the one or more tiles, generating one or more element nodes for one or more elements represented by the external data, generating one or more edges connecting the one or more element nodes to the one or more tile nodes, each of the one or more edges defining a relative pose for an element among the one or more elements in a frame of reference for a tile among the one or more tiles, and adding the generated one or more element nodes and one or more edges to the relative atlas graph. In addition, in some implementations, importing the external data further includes performing a corrective warp of the external data based upon sparse correspondences between the external data and one or more existing elements defined in the relative atlas graph.

Consistent with another aspect of the invention, an apparatus may include a memory, one or more processors coupled to the memory, and computer instructions executable by the one or more processors to generate mapping data for use by an autonomous vehicle, the computer instructions configured to generate a relative atlas graph for a geographical area in the memory based on a plurality of observations for the geographical area by generating a plurality of element nodes for a plurality of elements detected from the plurality of observations, each element node having an associated element from among the plurality of elements, generating a plurality of edges, each edge connecting a pair of element nodes from among the plurality of element nodes and defining a relative pose between the associated elements for the pair of element nodes, and storing the plurality of element nodes and the plurality of edges in the relative atlas graph in the memory.

Further, in some implementations, the apparatus includes an autonomous vehicle. Moreover, in some implementations, the apparatus includes a computer system that is remote from and in communication with one or more autonomous vehicles.

Consistent with another aspect of the invention, a method of generating mapping data for use by an autonomous vehicle may include receiving a plurality of observations for a geographical area, and generating a relative atlas graph for the geographical area based on the plurality of observations for the geographical area, including generating a plurality of element nodes for a plurality of elements detected from the plurality of observations, each element node having an associated element from among the plurality of elements, generating a plurality of edges, each edge connecting a pair of element nodes from among the plurality of element nodes and defining a relative pose between the associated elements for the pair of element nodes, and storing the plurality of element nodes and the plurality of edges in the relative atlas graph.

Consistent with another aspect of the invention, a method of propagating mapping data changes to an autonomous vehicle may include receiving a plurality of observations for a geographical area, modifying a relative atlas graph for the geographical area based on the plurality of observations for the geographical area, the relative atlas graph including a plurality of element nodes for a plurality of elements and a plurality of edges, each edge connecting a pair of element nodes from among the plurality of element nodes and defining a relative pose between the associated elements for the pair of element nodes, including detecting a changed element in the geographical area from the plurality of observations, and modifying a relative pose defined by a first edge connecting a first element node for the changed element to a second element node for another element in the relative atlas graph to reposition the changed element relative to the other element, and propagating the modification of the relative pose to the autonomous vehicle.

Further, in some implementations, modifying the relative atlas graph further includes detecting a new element in the geographical area from the plurality of observations, generating a new element node for the new element, generating a second edge connecting the new element node to an existing element node in the relative atlas graph, the second edge defining a relative pose between the new element and an existing element defined by the existing element node, storing the new element node and the second edge in the relative atlas graph, and propagating the new element node and the second edge to the autonomous vehicle.

Consistent with another aspect of the invention, a method of generating mapping data for use by an autonomous vehicle may include receiving a vehicle log for a geographical area, determining bounding boxes around a plurality of elements of interest in the vehicle log, triangulating a location of each element of interest among the plurality of elements of interest using the determined bounding boxes, generating in a relative atlas graph a plurality of element nodes defining the plurality of elements of interest, and generating a plurality of edges in the relative atlas graph, each edge connected to an element node among the plurality of element nodes and defining a relative pose for an element of interest defined thereby based on the triangulated location therefor.

In some implementations, determining the bounding boxes is performed automatically or manually with human assistance. Moreover, in some implementations, the elements of interest are traffic devices. Some implementations may further include generating in the relative atlas graph a plurality of tile nodes defining tiles representing regions of the geographical area, where generating the plurality of edges includes generating first and second edges respectively connecting a first element node for a first traffic device to first and second tile nodes among the plurality of tile nodes, the first and second edges respectively defining first and second relative poses for the first traffic device.

Consistent with another aspect of the invention, a method may be provided for deploying mapping data to an autonomous vehicle. The mapping data may be stored in a relative atlas graph including a plurality of element nodes for a plurality of elements, a first plurality of edges, each edge among the plurality of edges connecting a pair of element nodes from among the plurality of element nodes and defining a relative pose between the associated elements for the pair of element nodes, a plurality of tile nodes for a geographical area, each tile node representing a tile corresponding to a region of the geographical area, a second plurality of edges, each edge among the second plurality of edges connecting an element node from among the plurality of element nodes to a tile node from among the plurality of tile nodes and defining a relative pose of the associated element for the connected element node within a frame of reference for the connected tile node, and a third plurality of edges, each edge among the third plurality of edges connecting a pair of tile nodes from among the plurality of tile nodes and defining a relative pose between the associated tiles for the pair of tile nodes. The method may include determining a location of the autonomous vehicle, accessing the relative atlas graph to identify a root tile among the tiles represented by the plurality of tile nodes that is proximate the location of the autonomous vehicle, identifying one or more additional tiles proximate to the root tile by accessing one or more edges among the third plurality of edges, extracting a portion of the relative atlas graph, the portion including a root tile node for the root tile, one or more additional tile nodes for the one or more additional tiles, a subset of element nodes from among the plurality of element nodes, each element node is the subset connected by an edge from the second plurality of edges to the root tile or one of the one or more additional tile nodes, and each edge among the first, second and third pluralities of edges connected to any of the root tile node, one or more additional tile nodes, and subset of element nodes, and communicating the portion of the relative atlas graph to the autonomous vehicle.

Consistent with another aspect of the invention, a method may be provided for importing external data into a relative atlas graph used by an autonomous vehicle, where the relative atlas graph includes a plurality of element nodes for a plurality of elements, a first plurality of edges, each edge among the plurality of edges connecting a pair of element nodes from among the plurality of element nodes and defining a relative pose between the associated elements for the pair of element nodes, a plurality of tile nodes for a geographical area, each tile node representing a tile corresponding to a region of the geographical area, and a second plurality of edges, each edge among the second plurality of edges connecting an element node from among the plurality of element nodes to a tile node from among the plurality of tile nodes and defining a relative pose of the associated element for the connected element node within a frame of reference for the connected tile node. The method may include converting the external data to a fixed frame of reference, identifying one or more tile nodes from among the plurality of tile nodes in the relative atlas graph that represent one or more tiles proximate the external data in the fixed frame of reference, projecting the external data into a frame of reference for each of the one or more tiles, generating one or more element nodes for one or more elements represented by the external data, generating one or more edges connecting the one or more element nodes to the one or more tile nodes, each of the one or more edges defining a relative pose for an element among the one or more elements in a frame of reference for a tile among the one or more tiles, and adding the generated one or more element nodes and one or more edges to the relative atlas graph.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to the generation and use of a relative atlas system for an autonomous vehicle. Prior to a discussion of these implementations, however, an example hardware and software environment within which the various techniques disclosed herein may be implemented will be discussed.

Hardware and Software Environment

Figure 1:
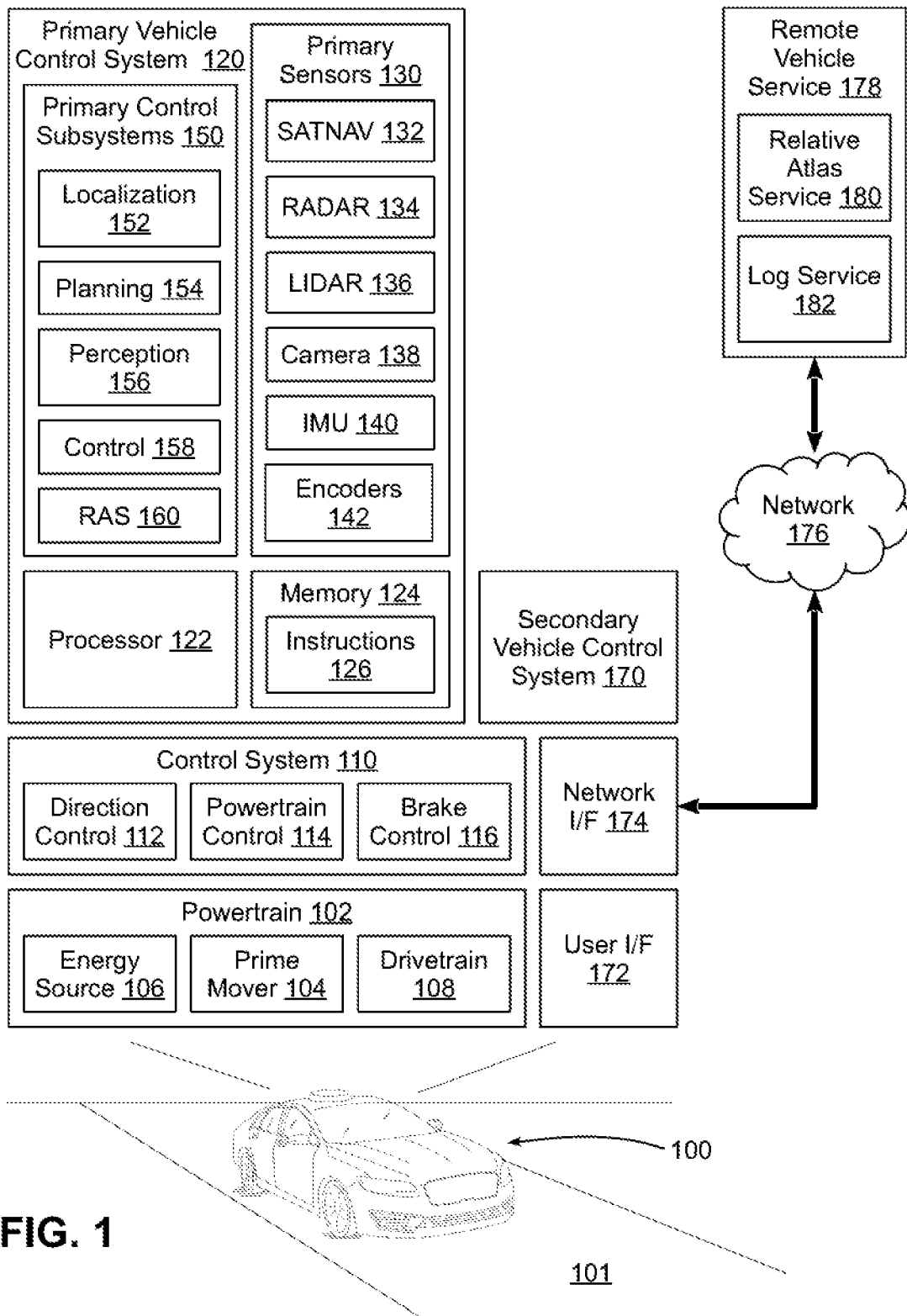
FIG. 1 illustrates an example hardware and software environment for an autonomous vehicle.

Turning to the Drawings, wherein like numbers denote like parts throughout the several views, FIG. 1 illustrates an example autonomous vehicle 100 within which the various techniques disclosed herein may be implemented. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection And Ranging (RADAR) and Light Detection and Ranging (LIDAR) sensors 134, 136, as well as a digital camera 138 (which may include various types of image capture devices capable of capturing still and/or video imagery), may be used to sense stationary and moving objects within the immediate vicinity of a vehicle. An inertial measurement unit (IMU) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned path of the vehicle.

In addition, a Relative Atlas Subsystem (RAS) 160 may be provided in the illustrated implementations to describe the elements within an environment and the relationships therebetween. As will be discussed in greater detail below, RAS 160 may be accessed by each of the localization, planning and perception subsystems 152-156 to obtain various information about the environment for use in performing their respective functions.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a cloud-based remote vehicle service 178 including, at least for the purposes of implementing various functions described herein, a relative atlas service 180 and a log collection service 182. Relative atlas service 180 may be used, for example, to maintain a global repository describing one or more geographical regions of the world, as well as to deploy portions of the global repository to one or more autonomous vehicles, to update the global repository based upon information received from one or more autonomous vehicles, and to otherwise manage the global repository. Log service 182 may be used, for example, to collect and/or analyze observations made by one or more autonomous vehicles during operation, enabling updates to be made to the global repository, as well as for other purposes.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Relative Atlas System

In the implementations discussed hereinafter, a relative atlas system is used to provide mapping data to an autonomous vehicle control system. The mapping data may be used for various purposes in an autonomous vehicle, including for localization, planning, and perception, among other purposes. It will be appreciated that for different types of autonomous vehicles, e.g., on-road land vehicles, off-road land vehicles, air vehicles, on-water vehicles, underwater vehicles, space vehicles, etc., different types of mapping data may be appropriate based upon the particular requirements of such vehicles. The discussion hereinafter will focus on the use of a relative atlas system with an on-road wheeled land vehicle such as a car, van, truck, bus, etc.; however, it will be appreciated that application of the herein-described techniques with other types of autonomous vehicles would be well within the abilities of those of ordinary skill having the benefit of the instant disclosure.

Within the context of an on-road land vehicle, mapping data may be used, for example, to lay out or place elements within a particular geographical area, which may include the entire world in some instances, or in other instances may be limited to a subset of the entire world. In some implementations, the elements may include elements that represent real world objects such as roadways, boundaries (e.g., barriers, lane dividers, medians, etc.), buildings, traffic devices (e.g., traffic signs, lights, etc.) and other static or fixed obstacles within an environment. Further, in some implementations the elements may include elements that are more logical or virtual in nature, e.g., elements that represent valid pathways a vehicle may take within an environment (referred to hereinafter as "gates"), "virtual" boundaries such as lane markings, or elements that represent logical collections or sets of other elements.

Mapping data in different implementations may also include data that characterizes or otherwise describes elements in an environment. For elements that represent real world objects, for example, data describing the geometry, dimensions, shape, etc. of such objects may be included. Further, data that describes the type, function, operation, purpose, etc., of elements in an environment may be included in some implementations. For example, data describing speed limits, lane restrictions, traffic device operations or logic, etc. may be included as mapping data in some implementations. In short, any data capable of describing some aspect of the environment within which an autonomous vehicle operates to enable the autonomous vehicle to operate within the environment may be incorporated as mapping data, so the invention is not limited to the specific types of mapping data described herein.

As noted above, mapping data may be used to lay out or place elements in a geographical area, and as such, further includes location data suitable for positioning elements within a digital map. A digital map, in this regard, may be considered to include any digital representation of a geographical area within which a vehicle may be located, and including information defining the positions and/or orientations of various elements in that geographical area, and in many instances along with additional information describing those elements. It will be appreciated that an autonomous vehicle control system may dynamically generate multiple types of digital maps in the course of controlling an autonomous vehicle, and a relative atlas system consistent with the invention may be used to generate such digital maps in some implementations.

Conventionally, positioning of elements in a digital map (a process that may also be referred to herein as layout or placement of elements) has relied upon absolute positioning, whereby elements are defined at absolute coordinates within a frame of reference of some particular area or volume, e.g., based on a global coordinate system from the perspective of the Earth. In some instances, tiles, which may also be referred to as grids, may also be defined to represent specific geographical areas of the Earth, and each tile may define a specific frame of reference that maps specific coordinates in the tile to the global coordinate system. Placement of an element within a tile therefore generally involves finding the coordinates in the tile that map to the absolute coordinates of the element. To assist in such placement, a tile may have an associated transformation function, or transformation, that may be used to mathematically calculate coordinates in the tile's frame of reference from the absolute coordinates of an element, or vice versa. As a consequence, multiple elements placed into a tile are generally placed at absolute positions relative to one another within the frame of reference of the tile.

As with any system based upon measurements captured from the real world, however, some degree of error will always be incorporated into location data. Some satellite navigation systems have precisions as poor as 10-20 meters, although sub-meter precisions may be achieved in some systems under certain circumstances. Moreover, even though sensors used to collect observations from a geographical area may have significantly finer resolutions, these sensors are generally mounted on moving vehicles and are therefore inherently constrained by the precision of the sensors used to locate the vehicles themselves.

Conventional approaches have sought to provide global consistency among elements represented within a maps through the use of such absolute positioning of elements. However, it has been found that global consistency often comes at the expense of local fidelity. Particularly with respect to low level autonomous control of a vehicle over relatively short time spans (e.g., over the next few seconds) and in a dynamic environment with both static and moving obstacles, accurately knowing both the position of a vehicle and of the static and moving obstacles within a radius of tens of meters from the vehicle is of far greater importance than knowing the distance of a vehicle from landmarks that may be kilometers or more away from the vehicle.

In implementations consistent with the invention, on the other hand, a relative atlas system is utilized to provide mapping data in a format in which the positions of elements in a geographical area are defined principally based upon relative positioning between elements rather than any absolute positioning within a global coordinate system. Put another way, two elements in a geographical area may be related with one another in a relative atlas system consistent with the invention by a relative pose that defines at least the position of one element relative to the position of the other element, and in some instances, without any concern for a common or global frame of reference. Thus, for example, given the position of one element in a digital map, a relative pose established between that element and another element may be used to determine the position at which the other element should be laid out in the digital map, and in some instances, without relying on a common or global frame of reference within which the positions of both elements may be defined. It will also be appreciated that, in some implementations a relative pose may also define one or more of a relative orientation, relative velocity and/or relative acceleration between two elements in addition to a relative position.

As will become more apparent below, the relative pose may be defined by a transformation function that is associated with a pair of elements and that permits a one-way or two-way transformation between the frames of reference of the respective elements. The transformation function may be a rigid transformation (i.e., a transformation that preserves shape and size) in some implementations. A frame of reference, in this regard, may be considered to be any arbitrary coordinate system, e.g., defined by two or more axes, within which the positions of and distances between objects defined in that frame of reference may be described.

Therefore, as an example, a transformation function might define a relative pose between two elements where one element is 1.323 meters in a direction of 4.34 degrees from another element, and with an orientation that is 0.87 degrees offset therefrom. As a result, regardless of the position at which one of the elements is placed in a digital map, the other element may be placed at a position that is relative to the first element by the values defined in the transformation function. Therefore, even if the position of the first element is somewhat offset from some global frame of reference (e.g., due to sensor errors, map errors, etc.), the position of the other element relative to that first element will still be consistent relative to the first element.

As will also become more apparent below, through the establishment of relative poses between elements within a geographical area, local fidelity in the immediate proximity of an autonomous vehicle may be improved, thereby providing a more precise and accurate representation of the environment surrounding the autonomous vehicle and the vehicle's location and orientation within that environment. Moreover, by deemphasizing global consistency, additions and modifications of elements in a relative atlas system may be implemented with lower processing overhead due to the fact that changes or corrections to the positions of some elements generally need not be propagated throughout a relative atlas system.

Figure 2:
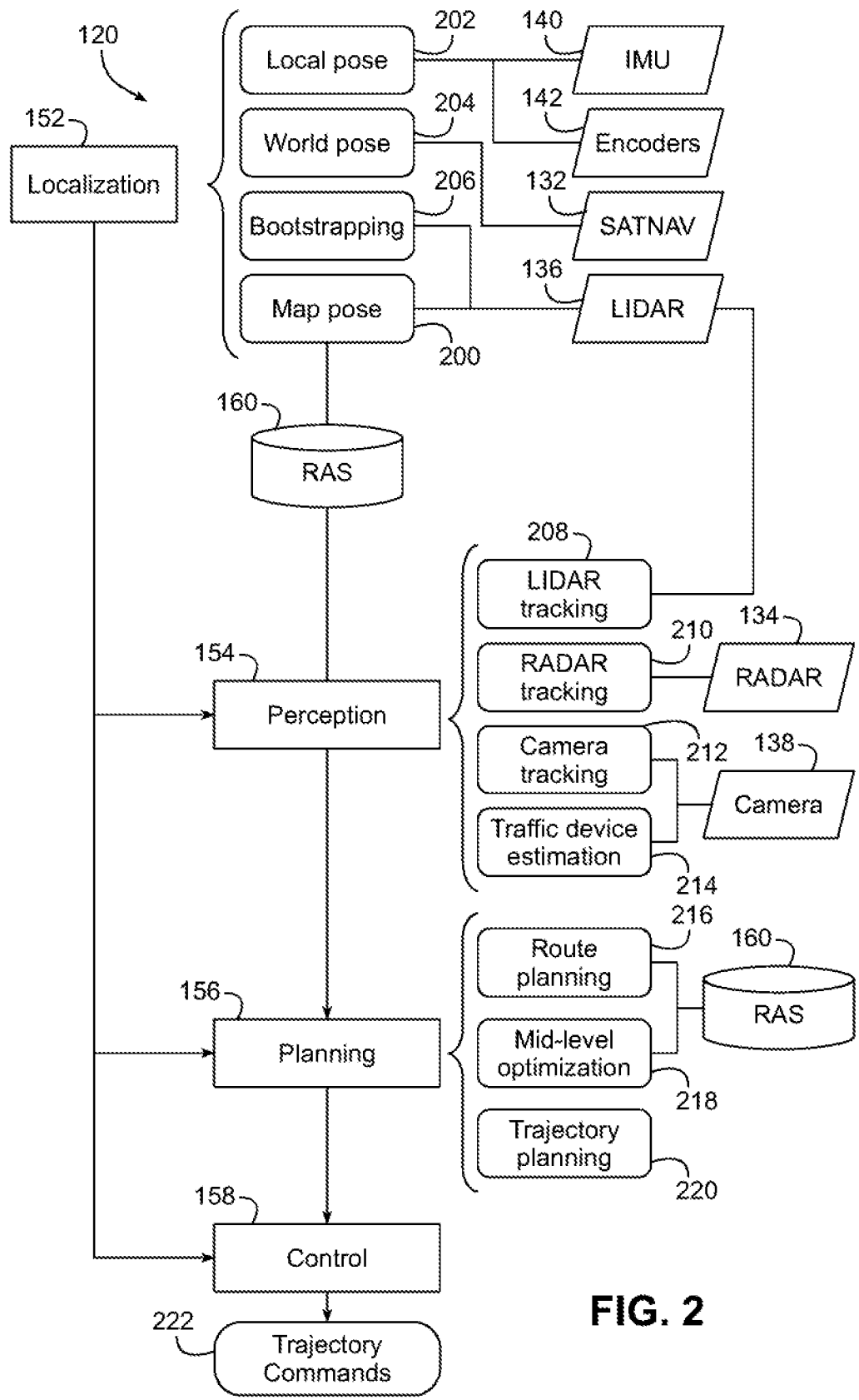
FIG. 2 is a block diagram illustrating an example implementation of the primary vehicle control system referenced in FIG. 1.

FIG. 2, for example, illustrates an example implementation of primary vehicle control system 120 of FIG. 1 and capable of utilizing a relative atlas system consistent with the invention. FIG. 2 in particular illustrates the responsibilities of the various subsystems 152-158 and their interaction with one another as well as with relative atlas system 160.

Localization subsystem 152 is generally responsible for providing localization data suitable for localizing a vehicle within its environment. Localization subsystem 152, for example, may determine a map pose 200 (generally a position, and in some instances orientation and/or speed) of the autonomous vehicle within its surrounding environment. As will become more apparent below, map pose 200 may be determined in part through the use of LIDAR 136, as well as using mapping data provided by relative atlas system 160. Moreover, map pose 200 may be determined in part upon additional poses determined by localization subsystem 152. Through the use of IMU 140 and wheel encoders 142, for example, a local pose 202 of the vehicle may be determined, generally including the speed, acceleration/deceleration, and direction of travel of the vehicle over some limited time frame, but without any position within a global coordinate system. A world pose 204 may be determined, e.g., using SATNAV 132, to provide a general position of the vehicle within a global coordinate system. Localization subsystem 152 may also include a bootstrapping function 206 to determine an initial pose of the vehicle upon startup, e.g., based upon the vehicle's last known position and orientation, and in some instances independent of any local or world pose, thereby providing a starting point from which future poses may be determined.

Localization data is provided by localization subsystem 152 to each of perception, planning and control subsystems 154, 156, 158. Perception subsystem 154, for example, is principally responsible for perceiving dynamic objects such as pedestrians and other vehicles within the environment, and may utilize LIDAR tracking functionality 208, RADAR tracking functionality 210 and camera tracking functionality 212 to identify and track dynamic objects using LIDAR 136, RADAR 134 and camera 138, respectively. As noted above, static objects in the environment may be represented in relative atlas system 160, and as such, perception subsystem 154 may access relative atlas system 160 in order to determine whether sensed objects are static or dynamic. Further, perception subsystem 154 may also include traffic device estimation functionality 214, which may process images captured by camera 138 to determine the current states of traffic devices represented in relative atlas system 160 (e.g., to determine whether a traffic light is green, amber or red).

Planning subsystem 156 is principally responsible for planning out a trajectory of the vehicle over some time frame (e.g., several seconds), and may receive input from both localization subsystem 152 and perception subsystem 154. Route planning functionality 216 may be used to plan a high level route for the vehicle based upon the static and dynamic objects in the immediate environment and the desired destination, while mid-level optimization functionality 218 may be used to make decisions based on traffic controls and likely motion of other actors in the scene, and both may utilize mapping data from relative atlas system 160 to perform their functions. Trajectory planning functionality 220 may generate a trajectory for the vehicle over some time frame (e.g., several seconds), which is then passed on to control subsystem 158 to convert the desired trajectory into trajectory commands 222 suitable for controlling the various vehicle controls 112-116 in control system 110, with localization data also provided to control subsystem 158 to enable the control subsystem to issue appropriate commands to implement the desired trajectory as the location of the vehicle changes over the time frame.

Figure 3:
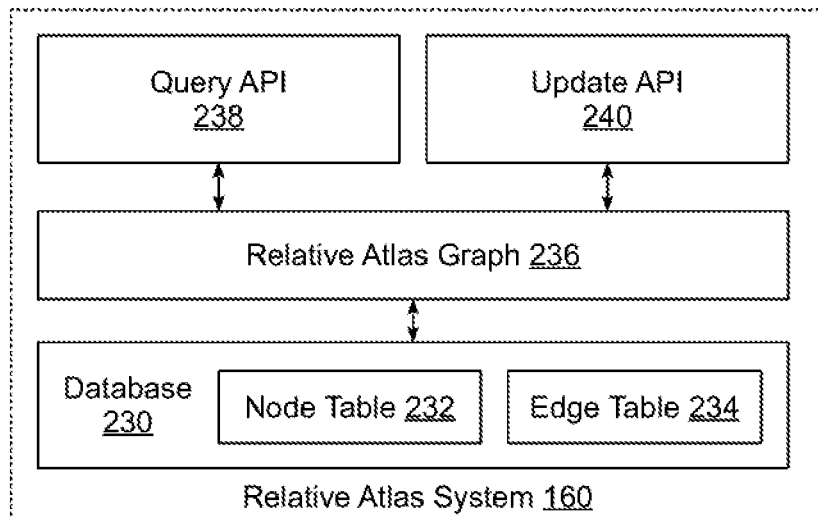
FIG. 3 is a block diagram illustrating an example implementation of the relative atlas system referenced in FIG. 2.

Now turning to FIG. 3, an example implementation of relative atlas system 160 is illustrated in greater detail. In this implementation, mapping data is logically organized into a graph of nodes interconnected by edges. Data is stored in a database 230 including a node table 232 storing a plurality of node records and an edge table 234 storing a plurality of edge records, and a relative atlas graph layer 236 may be used to access database 230 and provide both query and update functionality, e.g., through the use of query and update APIs 238, 240. Relative atlas graph layer 236 implements a data model for a relative atlas graph, and implements appropriate database calls to create, modify, query, retrieve data from, store data in, and otherwise access the relative atlas graph.

In some implementations, database 230 may be implemented as a SQL or relational database; however, the particular type of database used in relative atlas system 160 may vary in different implementations. Other types of databases, e.g., object-oriented or non-relational databases, among others, may be used in other implementations.

Figure 4:
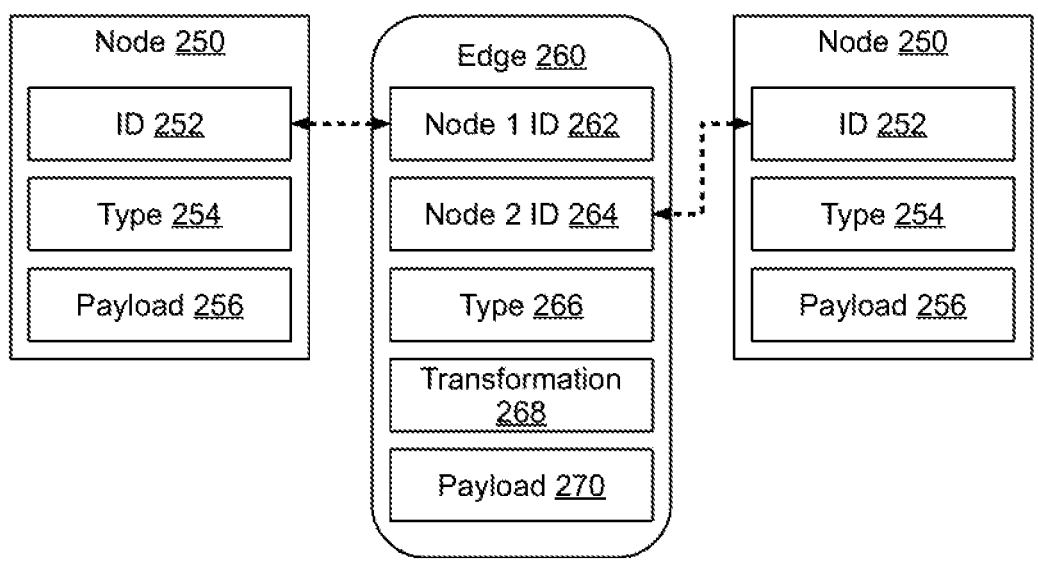
FIG. 4 is a block diagram illustrating an edge linking together two nodes from the relative atlas system of FIG. 3.

One suitable database schema for database 230 is illustrated in greater detail in FIG. 4, where node records 250 from node table 232 incorporate an identifier (ID) field 252, a type field 254, and a payload field 256 and edge records 260 from edge table 234 include a first node identifier (Node 1 ID) field 262, a second node identifier (Node 2 ID) field 264, a type field 266, a transformation field 268 and a payload field 270. It will be appreciated that the illustrated schema for database 230 is merely an example, and as such, the invention is not limited to this particular schema.

Each node record 250 includes a unique identifier field 252 to uniquely identify the corresponding node, such that each edge record 260 may store the node identifiers for the respective nodes connected by the corresponding edge in fields 262 and 264. By doing so, a graph may be traversed by "walking" from node to node using the edges connecting the nodes to one another.

Each type field 254, 266 defines a type for the corresponding node or edge. In different implementations, various types may be defined for nodes and/or edges, and a non-limiting example of types suitable for use in one implementation is discussed below in connection with FIGS. 5-7. Node types may be defined, for example, to represent different types of elements represented in a relative atlas graph, as well as different types of other entities represented in the relative atlas graph, including entities that define geographical areas and/or entities that group together logically-related elements, while edge types may be defined to represent different types of relationships established between nodes. The granularity of types may vary in different implementations, and multi-level type definitions, e.g., defining types and sub-types, etc., may be used in some implementations.

Each payload field 256, 270 generally includes additional data suitable for the particular type of the respective node/edge. The structure or schema of the data stored in a payload field 256, 270 may be defined by the associated type assigned to the node or edge in some implementations, while in other implementations the data stored in a payload field may be unstructured, or the structure or schema may be defined within the payload field itself, e.g., using an XML format. As will become more apparent below, the payload field may include minimal data, e.g., as little as a flag or a data value, or may include a substantial amount of data (e.g., a point cloud surface model of an entire geographical area), so the invention is not limited to storing any particular type or quantity of data within a payload field of a node or edge.

Each edge record 260, as noted above, additionally includes a transformation field 268, which is used to store a transformation defining a relative pose between the nodes connected by the associated edge. The transformation may be used, for example, to determine the distance and direction between elements represented by connected nodes, or alternatively, to determine the position of an element represented by a node within the frame of reference or coordinate system of another node connected thereto. A transformation may be unidirectional in some instances, but in many instances a transformation may be bidirectional in order to determine a relative pose starting from either node. A transformation may incorporate a mathematical function in some implementations if appropriate (e.g., where scaling between frames of reference is appropriate), although in many instances a transformation may be implemented using a vector that describes distance and direction between elements represented by two nodes, e.g., using polar or Cartesian coordinates. Furthermore, a transformation may define the relative orientation between elements represented by two nodes. Practically any representation suitable for defining the relative pose of an entity represented by one node in relationship to another entity represented by another node may be used in other implementations.

It will be appreciated that the provision of a type field on a node or edge facilitates database retrieval of subsets of nodes and/or edges of a particular type. Nonetheless, type fields may be omitted in some implementations, and types may be encoded into payloads, or alternatively different types may be represented through the use of different object types and/or database tables for different types of nodes and/or edges. Furthermore, with respect to transformation fields 268, these fields similarly may be omitted in some implementations, with the transformation defined in a payload field 270 or omitted entirely for edges for which no transformation is needed.

In general, an innumerable number of different manners exist for encoding relative poses between elements in a geographical area, as well as for encoding other data suitable for describing and/or categorizing elements and other entities suitable for use as mapping data by an autonomous vehicle control system. Therefore, the invention is not limited to the particular database schema and graph-based organization of the herein-described and illustrated relative atlas system 160.

Figure 5:
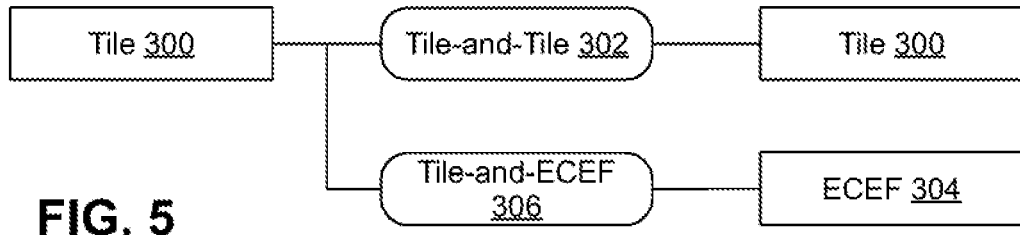
FIG. 5 is a block diagram illustrating example node and edge types suitable for use in defining tiles in the relative atlas system of FIG. 3.
Figure 6:
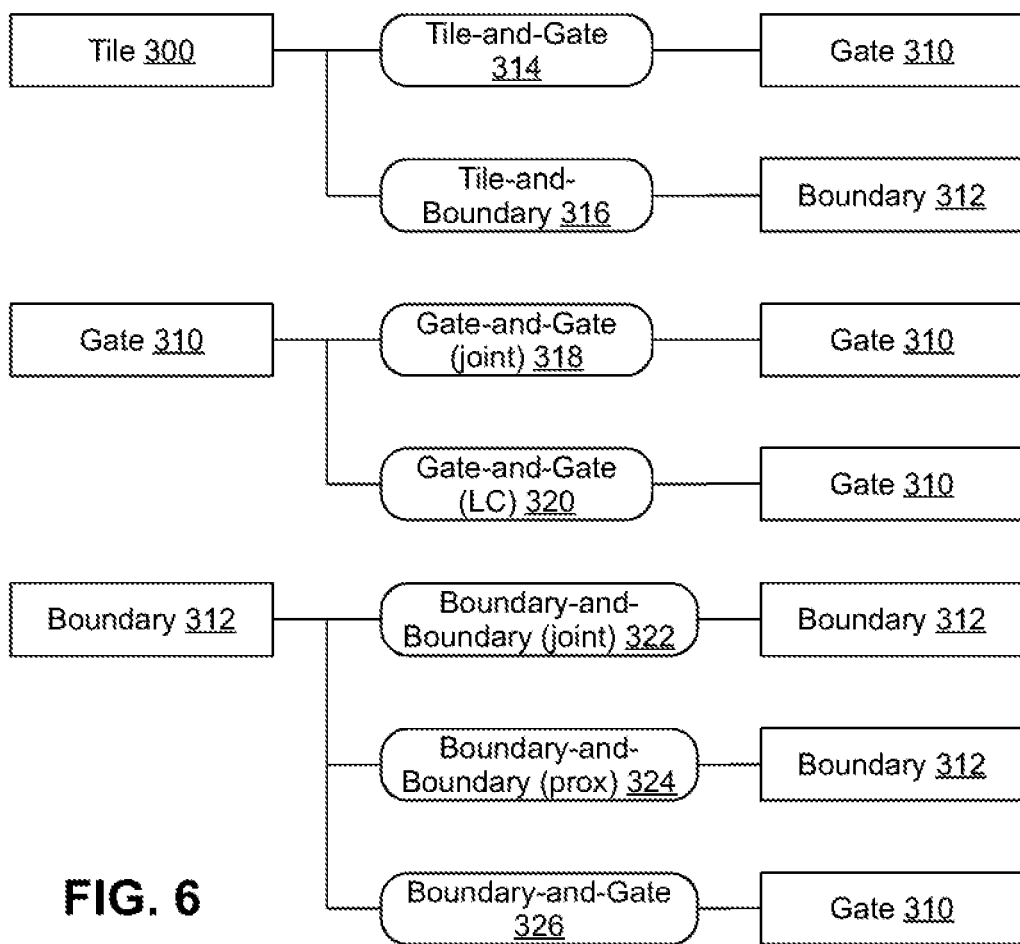
FIG. 6 is a block diagram illustrating example node and edge types suitable for use in defining gates and boundaries in the relative atlas system of FIG. 3.
Figure 7:
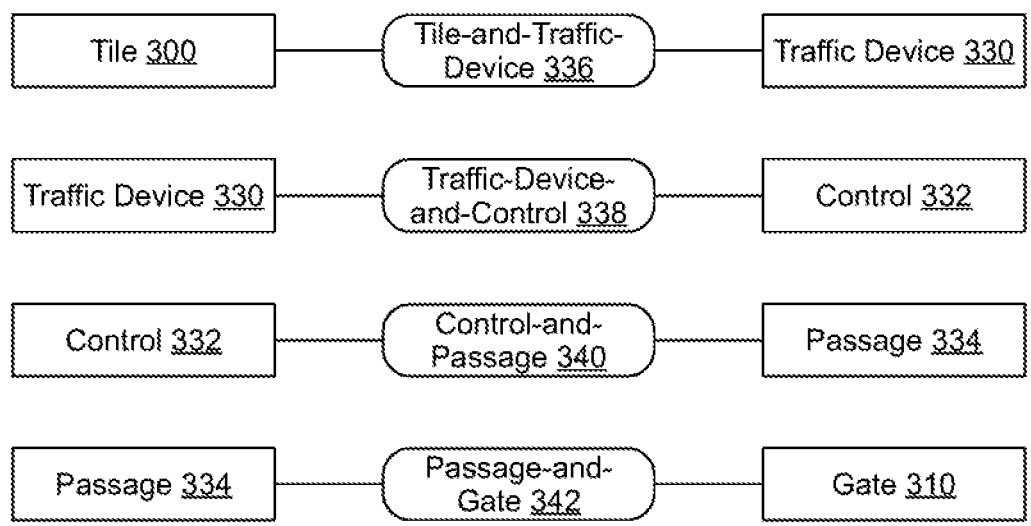
FIG. 7 is a block diagram illustrating example node and edge types suitable for use in defining traffic devices in the relative atlas system of FIG. 3.

Now turning to FIGS. 5-7, as noted above a relative atlas system consistent with the invention may be utilized to represent a wide variety of entities and other mapping data relevant to the control of an autonomous vehicle as well as relationships therebetween. A non-limiting representative set of node and edge types is illustrated in these figures, with various node types 300, 304, 310, 312, 330, 334 and 338 represented as rectangles and various edge types 302, 306, 314, 316, 318, 320, 322, 324, 326, 332, 336, 340 and 342 represented as rounded rectangles. It will be appreciated that other node and/or edge types may be used in other implementations, so the invention is not limited to this representative set of nodes and edge types.

FIG. 5, for example, illustrates a number of different node and edge types that may be suitable for use by localization subsystem 152. A tile node 300 may be used to represent a region or a portion (i.e., a tile) of a geographical area. Thus, rather than representing an element in a geographical area, a tile node may be considered to be a type of node referred to herein as a spatial node that represents an area or volume itself, and as such, a tile node may be considered to be a different type of node from an element node in the illustrated implementation. Moreover, a tile node may define a common frame of reference or a coordinate system for a particular area or volume, such that the transformation functions defined in the edges between a tile node and various element nodes may be used to position the elements represented by the connected element nodes at positions and/or orientations within the common frame of reference for the tile. In some implementations, for example, a tile node may have a square surface of approximately 200 square meters in size, although larger or smaller tile sizes, as well as other shapes, may be used in other implementations.

Tile nodes 300 may be connected to one another by tile-and-tile edges 302, which may be used to couple together adjacent tiles and/or non-adjacent but proximate tiles. Edges 302 define relative poses between tiles such that the relative distance between tiles and the relative orientation of tiles relative to one another may be ascertained. In some implementations, adjacent tiles may be overlapping (e.g., by about 25%) to provide greater coverage and less discontinuity at tile boundaries.

In addition, tile nodes 300 may be connected to a fixed reference node such as an Earth-Centered Earth-Fixed (ECEF) node 304 through a tile-and-ECEF edge 306. ECEF node 304 represents a point in a Cartesian coordinate system having orthogonal X, Y and Z-axes that cross at a the center of mass of the Earth, and with the Z-axis passing through true north, and the X-axis passing through 0 degrees longitude (Prime Meridian) and latitude (Equator). In some implementations, only a single ECEF node 304 is supported, such that the positions and orientations of all tile nodes may be defined relative to a common fixed reference point. Thus, each tile-and-ECEF edge 306 includes a transformation that defines a position and orientation of a connected tile to the ECEF reference point. As will become more apparent below, defining relative poses between tiles and a single reference point may enable one or more tiles proximate a particular SATNAV location to be identified for the purposes of localization, and may additionally assist with importing external mapping data into a relative atlas graph. Furthermore, in some implementations, ECEF node 304 may enable paths to be traversed between otherwise unconnected geographical areas. Thus, for example, if mapping data has been incorporated into a relative atlas graph for a geographical area in Florida and other mapping data has been incorporated into a relative atlas graph for a geographical area in Arizona, edges that connect the tile nodes of both relative atlas graphs to a common ECEF node enable relative poses to be determined between the tiles of both relative atlas graphs as well as any elements defined in those respective graphs, even though edges may not exist that directly connect any of the tile nodes and/or element nodes of the two relative atlas graphs. It will also be appreciated that other fixed reference points may be used in other implementations, and the term ECEF node may be considered to describe these other reference points as well.

Figure 8:
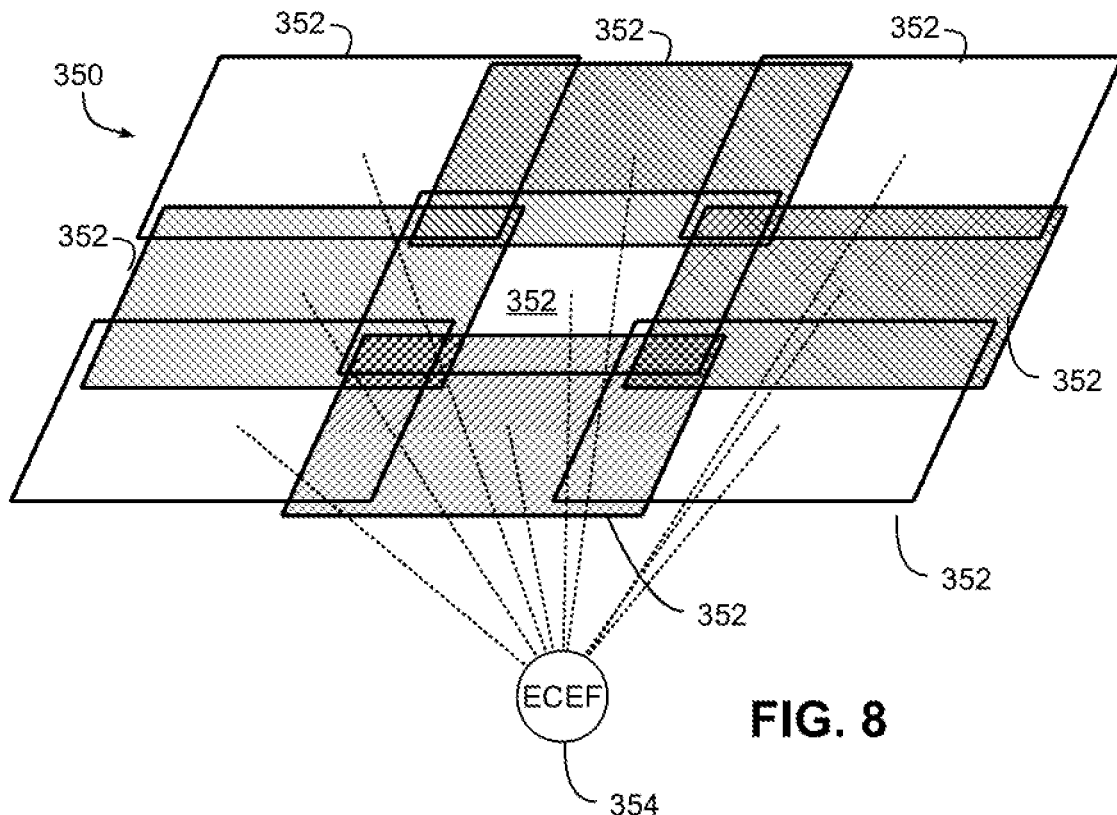
FIG. 8 is a functional view illustrating an example set of tiles defined by the relative atlas system of FIG. 3.

As a further illustration of the manner in which tiles may be represented in relative atlas system 160, FIG. 8 illustrates an example geographical area 350 partitioned into a set of nine tiles 352 arranged relative to a fixed reference point, such as an ECEF reference point 354 (alternating tiles are shown with cross-hatching for ease of understanding). Tiles 352 are laid out in a regular array and as illustrated overlap by about 25% with one another, and the relative poses between the tiles 352 and ECEF reference point 354 are represented by dashed lines.

Figure 9:
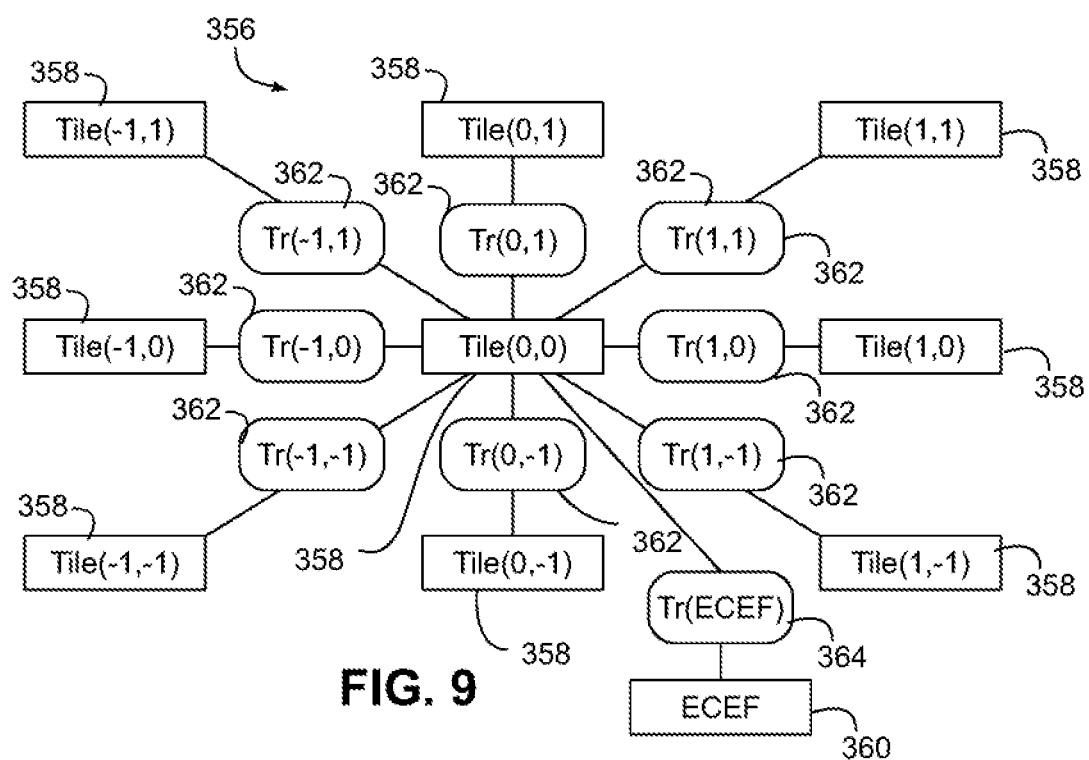
FIG. 9 is a block diagram illustrating example nodes and edges suitable for representing relationships within the example set of tiles of FIG. 8.

FIG. 9 in turn illustrates an example relative atlas graph or subgraph 356 including nine tile nodes 358 and one ECEF node 360 corresponding to tiles 352 and ECEF reference point 354 of FIG. 8. In this regard, the term "subgraph" may be used to refer to a portion of a larger relative atlas graph; however, it will also be appreciated that a subgraph itself may be considered to be a graph, albeit covering only a subset of the mapping data maintained in a relative atlas graph from which a subgraph has been extracted.

To simplify the example, only the edges connected to a center tile node 358 (designated as Tile(0,0), and corresponding to the tile 352 in the center of FIG. 8) are shown. Specifically, FIG. 9 includes eight tile-and-tile edges 362 connecting tile node 358 for Tile(0,0) to each of the other tile nodes 358 that represent tiles adjacent to Tile(0,0), which are indexed as Tile(−1,−1), Tile(0,−1), Tile(1,−1), Tile(−1,0), Tile(1,0), Tile(−1,1), Tile(0,1), and Tile(1,1). In addition, a tile-and-ECEF edge 364 connects tile node 358 for Tile(0,0) to ECEF node 360. In each edge 362, 364, a transformation function Tr( ) is stored to represent the relative pose between the tiles corresponding to the connected tile nodes 358 in edges 362 (transformation function Tr(x,y) describes the relative pose between Tile(0,0) and Tile(x,y)) and the relative pose between Tile(0,0) and the ECEF reference point in edge 364 (via transformation function Tr(ECEF)).

It will be appreciated that additional edges may connect other adjacent tile nodes 358 to one another and to ECEF node 360. Further, in some implementations, edges may be used to connect tile nodes for non-adjacent tiles together if appropriate.

Returning now to FIG. 6, this figure illustrates a number of different node and edge types that may be suitable for use by planning subsystem 156. Planning system 156 may in particular rely on gate nodes 310 and boundary nodes 312 to determine potential paths suitable for use by an autonomous vehicle and to select an appropriate path from among those potential paths.

A gate node 310, in particular, may be used to represent a permissible vehicle pose within a geographical area, i.e., a valid or allowed pose or position of for autonomous vehicle within the geographical area, and may be analogized in some instances to a gate used in downhill skiing, such that a sequence of gates may be used to define a potential path a vehicle may take through a geographical area. In some instances, a gate node may merely define a position, while in other instances an orientation may also be defined to represent the direction a vehicle will travel when passing through the gate. A gate node may also define the dimensions of a gate (e.g., a width) in some implementations if desired, although no dimensions are included in the illustrated implementation. Gate nodes (or edges connected thereto) may also encode temporal or other conditional information in some implementations, e.g., to vary the nature of such gates under different situations such as different times of day, different days of the week, etc.

A boundary node 312 may be used to represent any physical or virtual boundary within a geographical area that restricts vehicle movement. Physical boundaries may include, for example, road edges, curbs, medians, barriers, fences, walls, barricades, guardrails, etc., and any other physical objects that restrict vehicle movement, while virtual boundaries may include, for example, lane boundaries or partitions that separate lanes of traffic in a multi-lane highway, separate driving lanes from shoulders, separate driving lanes from turn lanes or from lanes for oncoming traffic, among others. Thus, in contrast with gate nodes that define vehicle positions that are permitted within a geographical area, boundary nodes generally define positions or regions where a vehicle may not be permitted, either due to a physical obstruction or a virtual obstruction (e.g., crossing of a double yellow line is generally prohibited). Boundary nodes (or edges connected thereto) may also encode temporal or other conditional information in some implementations, e.g., to vary the nature of such boundaries under different situations such as different times of day, different days of the week, etc.

A number of different edge types may be defined for use with gate and boundary nodes. For example, tile-and-gate and tile-and-boundary edges 314, 316 may be used to respectively connect gate and boundary nodes 310, 312 to a tile node 300, with transformations included in such edges to define the relative pose of each gate and boundary to the connected tile.

Gate nodes 310 may be connected to other gate nodes 310 through gate-and-gate(joint) edges 318 and gate-and-gate (lane change) edges 320. Gate-and-gate(joint) edges 318, for example, may be used to link together gate nodes 310 that extend along a lane of a roadway to represent a continuous path along a lane of a roadway. These types of relationships are referred to herein as joint-type relationships. Gate-and-gate(lane change) edges 320, for example, may be used to link together gate nodes 310 for gates that are not in the same lane and thus represent different lanes in one or more roadways, but where autonomous vehicle travel between the gates is still permitted, at least in some circumstances, e.g., when changing between lanes, when passing, when turning onto a different road, when entering or exiting a roadway, when entering or exiting a traffic circle, etc. These latter types of relationships are referred to herein as non-joint-type relationships. In the illustrated implementation, a single gate-and-gate(lane change) edge type is used to represent each of these types of permitted non-joint vehicle paths, although in other implementations, different edge types may be used to define different types of relationships between non-joint gates (e.g., for adjoining lanes in the same roadway, for turns onto different roadways, for entrance or exit ramps, etc.). In still other implementations, a single gate-and-gate edge type may be used to represent all gate-to-gate connections, including all joint-type relationships and all non-joint-type relationships, with data maintained in the payload of the edge defining the specific relationship between the connected gates. By defining different edge types, however, queries to the relative atlas system may be simplified in some implementations, e.g., to retrieve only a list of gates corresponding to the current lane in which a vehicle is traveling, to retrieve a list of gates corresponding to exit ramps proximate a particular vehicle position, etc.

Boundary nodes 312 may be connected to other boundary nodes 312 through boundary-and-boundary(joint) edges 322 and boundary-and-boundary(proximate) edges 324. Boundary-and-boundary(joint) edges 322, for example, may be used to link together boundary nodes 312 that represent a continuous boundary. Boundary-and-boundary(proximate) edges 324 may be used to link together boundary nodes 312 that are within a certain distance from one another, but otherwise represent distinct boundaries, thereby enabling in some instances all of the boundaries within a certain radius of a vehicle to be determined through walking between the various connected boundary nodes in a relative atlas graph. Boundary nodes 312 and gate nodes 310 may also be connected to one another through boundary-and-gate edges 326, which define the relative poses between boundaries and gates and thereby enable both boundaries proximate a given gate and gates proximate a given boundary to be identified.

In some implementations, gate and/or boundary nodes 310, 312 may include geometry information (e.g., encoded within the payload thereof) that defines dimensions, volumes, areas, positions, orientations, etc. of associated gates or boundaries, while in some implementations, gates and/or boundaries may be dimensionless and dimensions may be generated based upon information stored in a connecting edge and/or simply based upon the relative pose defined in a connecting edge. For example, in some implementations, for multiple boundary nodes 312 connected by boundary-and-boundary(joint) edges 322, curve fitting may be used to generate a continuous boundary curve based upon the positions and orientations of the boundaries represented by the connected boundary nodes.

Figure 10:
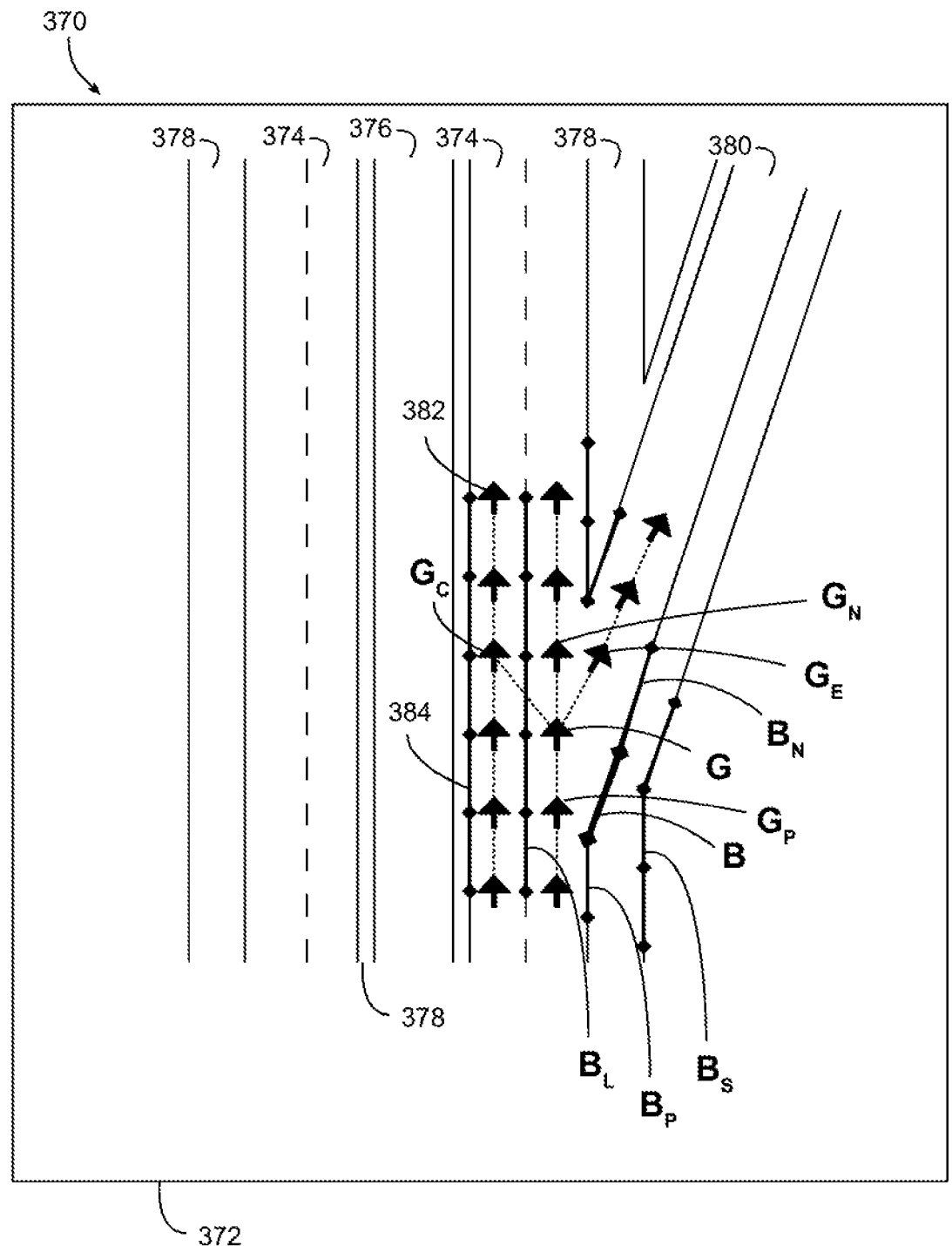
FIG. 10 is a functional top plan view illustrating an example set of gates and boundaries defined by the relative atlas system of FIG. 3.

As a further illustration of the manner in which gates and boundaries may be represented in relative atlas system 160, FIG. 10 illustrates an example geographical area 370 covered by a single tile 372 and including a four lane divided roadway including two lanes 374 in each direction and separated by a median 376, and with shoulders 378 extending along both sides of each pair of lanes 374. Also illustrated is a single lane exit ramp 380 with shoulders extending along both sides thereof. To represent the paths and obstacles in this geographical area, a plurality of gates 382 and boundaries 384 may be defined, with the former represented by bold arrows interconnected by dashed lines, and the latter represented by line segments with diamond endpoints. The gates and boundaries corresponding to only a portion of geographical area 370 are illustrated in FIG. 10 to simplify the figure, and it will be appreciated that additional gates and boundaries may be defined to similarly cover the remainder of geographical area 370. It may be seen that gates may be defined along each lane 374 as well as along exit ramp 380, and further, boundaries may be defined between lanes, between each lane and the shoulder, at the edge of each shoulder, along the median, as well as along any other physical obstacles that may exist within the geographical area.

Figure 11:
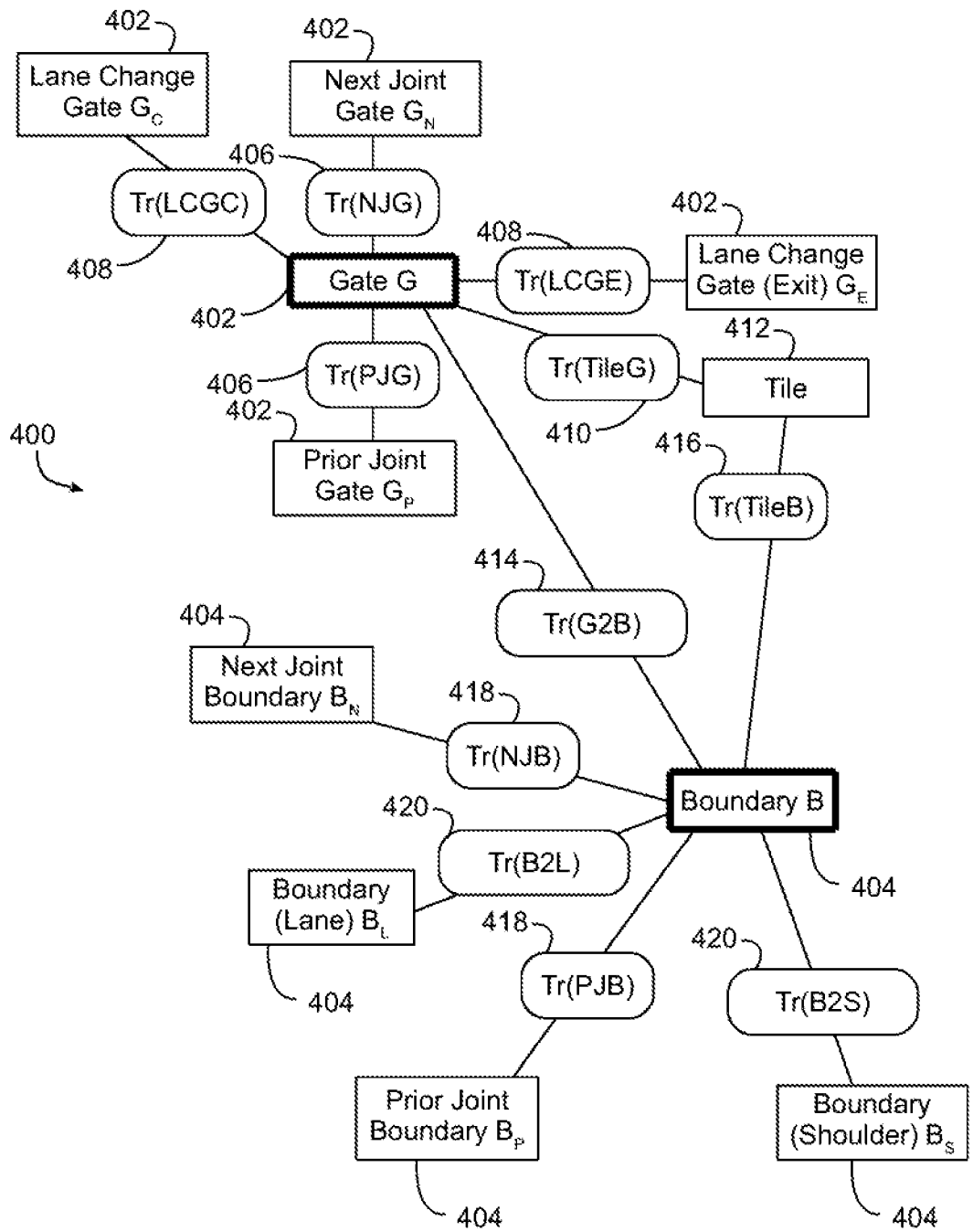
FIG. 11 is a block diagram illustrating example nodes and edges suitable for representing relationships within the example set of gates and boundaries of FIG. 10.

FIG. 11 in turn illustrates an example relative atlas graph or subgraph 400 representing a portion of geographical area 370 of FIG. 10, specifically covering the boundaries and gates connected to a gate G and a boundary B illustrated in bold in the figure. Subgraph 400 includes multiple gate nodes 402 (including a gate node 402 shown with a thicker outline for gate G) and boundary nodes 404 (including a boundary node 404 shown with a thicker outline for boundary B), and for gate G, gate-and-gate(joint) edges 406 are shown connecting to gate nodes 402 corresponding to next and prior joint gates labeled $G_N$ and $G_P$ in FIG. 10. Gate-and-gate(lane change) edges 408 are similarly shown connecting to gate nodes 402 corresponding to a lane change gate $G_C$ and a lane change(exit) gate $G_E$ of FIG. 10. The gate node 402 for gate G is also connected via a tile-and-gate edge 410 to a tile node 412 corresponding to tile 372 of FIG. 10, and a boundary-and-gate edge 414 connects the gate node 402 for gate G to the boundary node 404 corresponding to boundary B.

The boundary node 404 for boundary B is likewise connected to tile node 412 via a tile-and-boundary edge 416. Boundary-and-boundary(joint) edges 418 connect the boundary node 404 for boundary B to boundary nodes 404 corresponding next and prior boundaries labeled $B_N$ and $B_P$ in FIG. 10, while boundary-and-boundary(proximate) edges 420 connect the boundary node 404 for boundary B to boundary nodes 404 corresponding to lane boundary $B_L$ and shoulder boundary $B_S$ of FIG. 10.

Of note, each edge 406, 408, 410, 414, 416, 418, 420 includes an appropriate transformation function Tr( ) defining the relative pose between the entities represented by the connected nodes. For gate-and-gate(joint) edges 406, transformations Tr(NJG) and Tr(PJG) are respectively defined to represent the transformation functions between Gate G and the next and prior joint gates $G_N$ and $G_P$. For gate-and-gate (lane change) edges 408, transformations Tr(LCGC) and Tr(LCGE) are respectively defined to represent the transformation functions between Gate G and lane change gate $G_C$ and lane change(exit) gate $G_E$. For tile-and-gate edge 410 a transformation function Tr(TileG) is defined to represent the transformation function between the tile and Gate G. For boundary-and-gate edge 414, a transformation function Tr(G2B) is defined to represent the transformation function between Gate G and boundary B, while for tile-and-boundary edge 416 a transformation function Tr(TileB)

is defined to represent the transformation function between the tile and Boundary B. For boundary-and-boundary(joint) edges 418, transformations Tr(NJB) and Tr(PJB) are respectively defined to represent the transformation functions between Boundary B and the next and prior joint boundaries $B_N$ and $B_P$. For boundary-and-boundary(proximate) edges 420, transformations Tr(B2L) and Tr(B2S) are respectively defined to represent the transformation functions between Boundary B and lane boundary $B_L$ and shoulder boundary $B_S$.

In addition, it will be appreciated that additional edges may connect other adjacent gate and boundary nodes to any of the nodes illustrated in FIG. 11. However, many of these edges have been omitted in order to simplify FIG. 11.

Now returning to FIG. 7, this figure illustrates a number of different node and edge types that may be suitable for defining traffic controls, e.g., for use by perception subsystem 154. In the illustrated implementation, for example, traffic device nodes 330, control nodes 332, and passage nodes 334 may be used to define traffic controls and the surrounding environment controlled thereby, and as such may be considered to be examples of different types of traffic nodes. In one implementation, for example, a traffic device node 330 may represent a traffic device such as a face of a traffic signal (e.g., all of the lights on a traffic signal that control a particular lane in a roadway), a traffic sign, railroad crossing, or any other traffic indicator that is capable of directing the flow of traffic. A traffic device node 330 may define a variable state of the associated traffic device, or may define the conditions from which a variable state of the associated traffic device may be perceived, and may further include data that otherwise characterizes the device, including, for example, the logic implemented by the traffic device, the available light combinations/states supported by the traffic device, any context usable to reliably perceive a traffic device's state (e.g., any variation from a nominal shape or face layout), etc. A traffic device node 330 may also be connected to a tile node 300 through a tile-and-traffic-device edge 336 defining a relative pose of the traffic device with respect to a tile. As will become more apparent below, the relative pose of a traffic device may also include altitude or elevation information, and either the edge or the traffic device node may include geometry information (e.g., the size and/or position of a bounding box) to provide guidance to assist locating the traffic device in image data captured by a camera of an autonomous vehicle so that the state of the traffic device can be monitored when the autonomous vehicle is in the vicinity of the traffic device.

Each traffic device node 330 may also be connected to a control node 332 through a traffic-device-and-control edge 338. A control node 332 may be used to represent a traffic control that groups together multiple traffic devices to regulate traffic flow into a geographical area, e.g., traffic devices associated with a given approach into a given intersection, so that a common "state" can be defined for the regulated geographical area and thereby enable an autonomous vehicle to plan a trajectory based upon the current state of the traffic controls in the vicinity of the autonomous vehicle upon its approach to the regulated geographical area. Put another way, a control node 332 may be considered to be a logical aggregation point for one or more traffic devices that inform the same variable state. Such a node may be joined, for example, to all of the visible traffic devices in any one approach to an intersection or other regulated geographical area, as all such traffic devices inform a hypothetical driver in that location. In the illustrated implementation, a control node is not joined to the traffic devices of opposing or cross traffic lanes, or other approaches to the same regulated geographical area. Instead, these other traffic devices may be joined to their own associated control nodes for the other approaches. In other implementations, however, a control node may be used to represent traffic devices associated with multiple approaches to an intersection.

A control node 332 may also be connected to one or more passage nodes 334 through a control-and-passage edge 340. A passage, in this regard, may refer to a given path through a geographical area regulated by a particular control (and associated traffic devices). As an example, for a fairly standard intersection of a pair of two lane roads, for each of the four approaches to the intersection, separate passages may be defined to represent traveling straight through the intersection, turning left at the intersection, or turning right at the intersection, such that a total of twelve passages may be defined for a particular control associated with that intersection.

Each passage node 334 may also be linked to one or more sequential gate nodes 310 through passage-and-gate edges 342, thereby linking passages to particular sequences of gates defining acceptable poses for a vehicle in a geographical region regulated by a traffic control.

Figure 12:
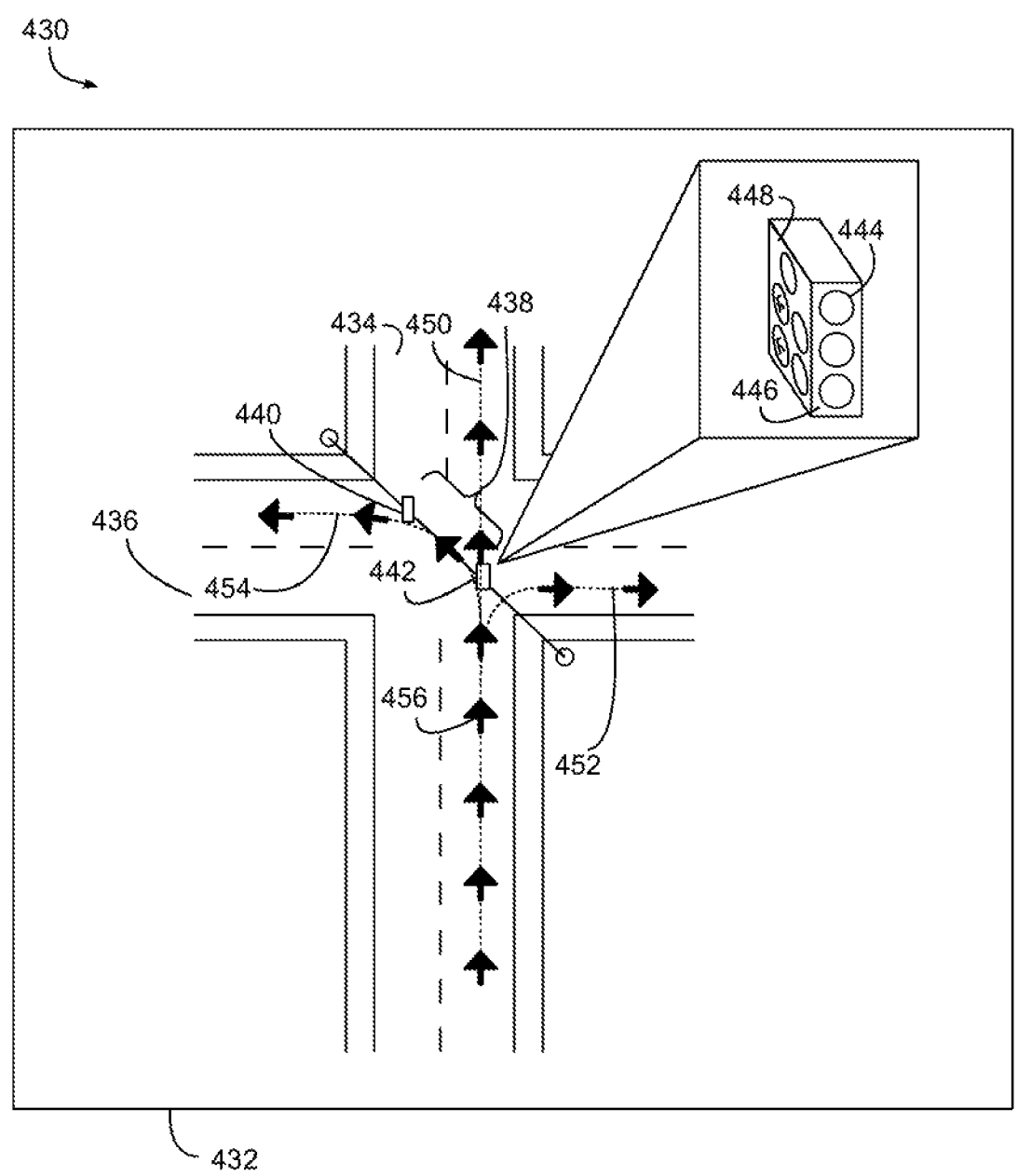
FIG. 12 is a functional top plan view illustrating an example set of gates and traffic devices defined by the relative atlas system of FIG. 3.

The relationships between traffic device, control, passage and gate nodes may be further explained with reference to FIGS. 12-13. FIG. 12, in particular, illustrates an example regulated geographical area 430 (here an intersection) covered by a single tile 432 and including a pair of two lane roads 434, 436 regulated by a traffic control 438 including a pair of suspended traffic light units 440, 442, each having multiple faces representing different traffic devices within relative atlas system 160. Traffic light unit 442, for example, is shown in an enlarged perspective view as having a plurality of indicators 444 disposed on two faces 446, 448. Face 446, which controls northbound traffic (north being at the top of FIG. 12), includes red, amber and green indicators 444 and therefore defines three states: stop, caution, and go. As illustrated by face 448, however, traffic devices can take a number of additional forms in other implementations, e.g., to support turns, pedestrians, bicycles, and other intersection-specific circumstances that will be appreciated by those of ordinary skill having the benefit of the instant disclosure.

In addition, as noted above, multiple passages may be defined to address each of the possible paths through the regulated geographical area 430. For northbound traffic, for example, three passages 450, 452 and 454 may be defined, respectively representing a straight path through the intersection, a right turn and a left turn. Moreover, as noted above, each passage may be logically coupled to various gates 456 defining the vehicle poses in the permissible paths through the intersection.

Figure 13:
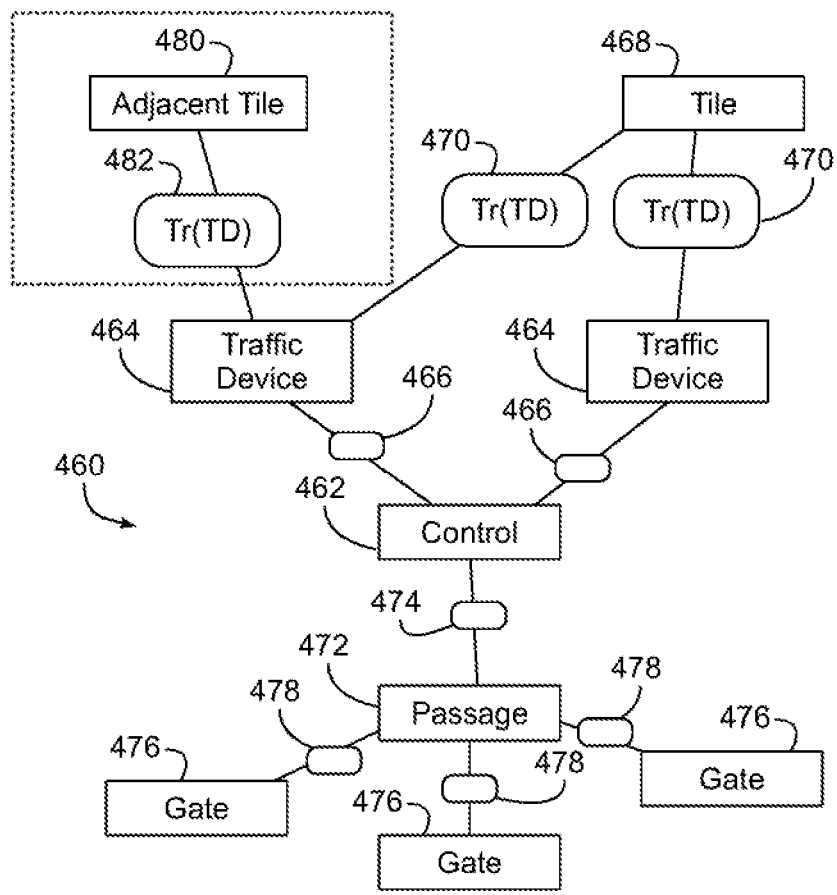
FIG. 13 is a block diagram illustrating example nodes and edges suitable for representing relationships within the example set of gates and traffic devices of FIG. 12.

FIG. 13 in turn illustrates an example relative atlas graph or subgraph 460 representing a portion of geographical area 430 of FIG. 12, specifically covering the traffic devices regulating the geographical area. Subgraph 460 includes a control node 462 representing traffic control 438, which is connected to a plurality of traffic device nodes 464 representing logically-linked traffic devices (e.g., faces 446 and 448 of traffic light unit 440) through traffic-device-and-control edges 466. Each traffic device node 464 is connected to a tile node 468 (e.g., corresponding to tile 432 of FIG. 12) by tile-and-traffic-device edges 470, and as may be appreciated from the figure, each edge 470 defines a relative pose for the traffic device within the tile associated with tile node 468.

Control node 462 is also illustrated as being connected to a passage node 472 through a control-and-passage edge 474

(e.g., representing passage 450 of FIG. 12), which is in turn connected to a plurality of gate nodes 476 through corresponding passage-and-gate edges 478. Of note, none of edges 466, 474 or 478 includes meaningful transformation functions as in the example graph schema described herein no relative pose need be defined between a control and traffic device, a control and a passage, or a passage and a gate (although transformation fields may still be present in each edge). Gate nodes 476 may be connected to other gates, boundaries and/or tiles in the manner described above to enable gates to be appropriately placed within a digital map, while the transformations defined in tile-and-traffic-device edges 470 may be used to place traffic devices within a digital map. In other implementations, however, relative poses between traffic devices, controls, passages and/or gates may be defined.

Figure 14:
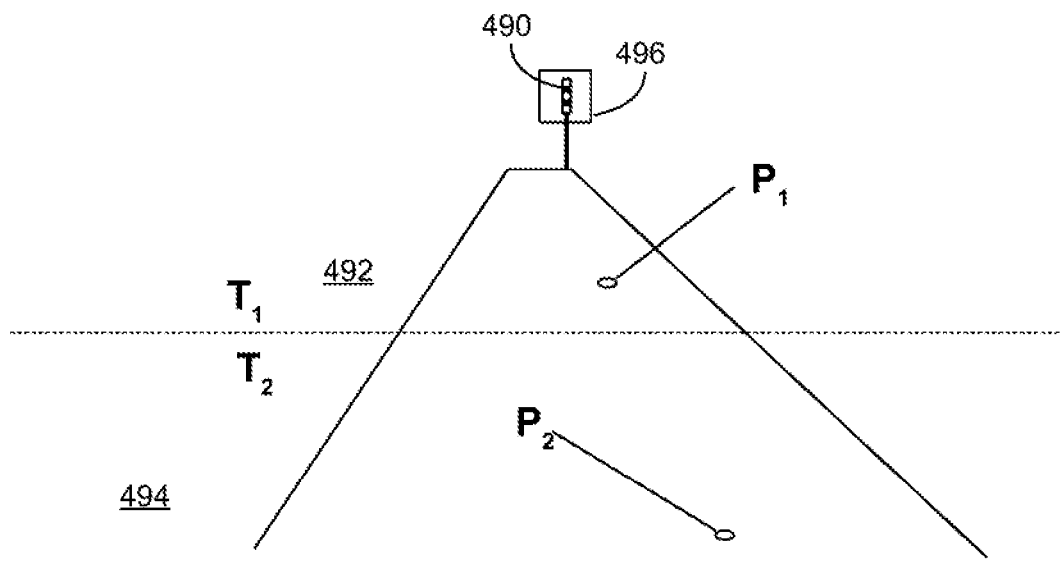
FIG. 14 is a functional perspective view illustrating a relative pose of a traffic device within two adjacent tiles.

FIG. 13 also illustrates how some element nodes may be connected to multiple tile nodes in some implementations, i.e., how element nodes may not be restricted to placement relative to a single tile. In particular, one traffic device node 464 is illustrated as being further connected to an adjacent tile node 480 through a tile-and-traffic-device edge 482 defining a different transformation or relative pose of the traffic device within an adjacent tile. The same element, i.e., a traffic device, is therefore defined with a different relative pose with respect to multiple tiles. FIG. 14 further illustrates such a relationship, whereby a traffic device 490 is shown at a fixed position within a tile 492 (Tile $T_1$), with another tile 494 (Tile $T_2$)adjacent thereto. A bounding box 496 for traffic device 490 may have two different relative poses defined for tiles $T_1$ and $T_2$, and depending upon the current position of an autonomous vehicle (e.g., within the boundary of tile $T_1$ such as at position N, or within the boundary of tile $T_2$ such as at position $P_2$) only one of those relative poses may be used to lay out the traffic device.

Within the context of traffic devices, defining relative poses to multiple tiles may facilitate, for example, identifying a traffic device with traffic signal estimation functionality in an autonomous vehicle control system. It will be appreciated that traffic devices may be visible from some distance away, and as such, both an autonomous vehicle attempting to determine the state of a traffic device, as well as a vehicle that captures observations within a geographical area for the purpose of generating or updating a relative atlas, may attempt to locate a traffic device when the traffic device is separated by one or more tiles from the tile in which the vehicle is located. By determining separate relative poses for a traffic device to define the positional relationship between the traffic device and multiple different tiles from which the traffic device is visible, a relative pose specific to a particular tile may be used when an autonomous vehicle is located in that tile, and doing so may facilitate identification of that traffic device within image data captured by that autonomous vehicle since the position and orientation of the autonomous vehicle when the image data is captured is likely to be similar to the position and orientation of the vehicle that originally captured the observation corresponding to the traffic device. Put another way, if a first vehicle is capturing image data while traveling in a first tile, and that image data includes a particular traffic device that is visible in the first tile but is physically located in a second tile that is three tiles away, the relative pose calculated for the traffic device relative to the first tile is desirably used in some implementations to identify the traffic device in image data captured by a second vehicle that later travels through the first tile.

It will be appreciated that other types of element nodes may also have relative poses defined with respect to multiple tile nodes, as well as with respect to multiple other element nodes, such that in many implementations a given element represented within a relative atlas graph will be connected through multiple edges having multiple transformations defining multiple relative poses with respect to multiple tiles and/or elements represented in the same relative atlas graph. Moreover, it will be appreciated that the provision of multiple edges may enable multiple layout strategies to be employed in order to lay out elements within a digital map, and as such, a layout strategy best suited for one purpose may be used to layout elements for that purpose, while a different layout strategy more suited for another purpose may be used to layout elements for that other purpose. Some layout strategies, for example, may start at an element node for a particular element and walk from element node to element node performing transformations defined in each of the connecting edges to determine the poses of different elements relative to the starting element, while other layout strategies may lay out elements using the transformations defined in the edges connecting element nodes to tile nodes, such that all elements are positioned based upon their relative poses to a given tile's frame of reference. Still other strategies may lay out elements using transformations defined in the edges connecting tile nodes to an ECEF node, such that all elements are positioned based upon their relative poses to a global frame of reference. Still other layout strategies may utilize a combination of approaches as between elements, between elements and tiles and/or between tiles and a global reference point. The flexibility afforded by the herein-described relative atlas graph architecture may therefore support a wide variety of layout approaches in different implementations.

Relative Atlas Generation and Management

Generation of a relative atlas for use with an autonomous vehicle may be based in some implementations on observations collected from a geographical area. The observations may be collected by one or more vehicles, and in some implementations the vehicles may be autonomous, although in other implementations human-guided vehicles may be used to collect observations. Observations may also be collected in other manners in other implementations, and as will be discussed in greater detail below, mapping data may be imported into a relative atlas from external sources in some implementations.

An observation, in this regard, may be considered to include data sensed from a geographical area, e.g., using image data captured from a vehicle-mounted camera, LIDAR data, RADAR data, SATNAV data, IMU data, encoder data, etc., as well as data derived from sensed data, e.g., paths, positions and/or orientations of a vehicle as it travels through a geographical area. An observation may also include data received from overhead satellites, airplanes, drones, etc., fixed sensors disposed within the geographical area, or practically any other type of sensor from which information about a geographic area may be collected.

In the illustrated implementation, observations may be used to generate element nodes representing elements in the geographical area, which may then be connected by edges that define relative poses between the elements of the connected element nodes. These element nodes and edges may be stored in a relative atlas, e.g., within a relative atlas graph, for later retrieval when attempting to lay out the elements within at least a portion of the geographical area represented by the relative atlas.

Figure 15:
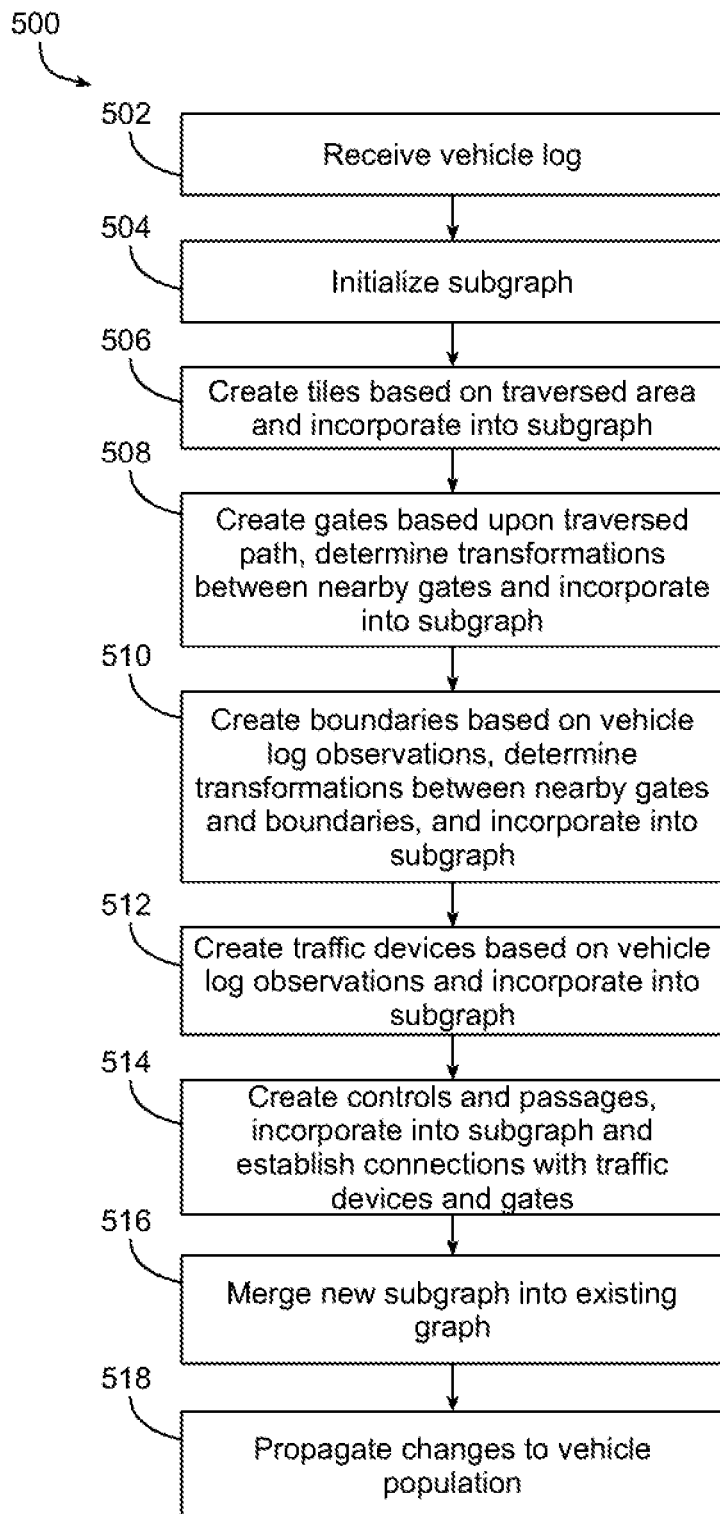
FIG. 15 is a flowchart illustrating an example sequence of operations for generating a subgraph for a geographical area in the relative atlas system of FIG. 3.

FIG. 15, for example, illustrates an example sequence of operations 500 for generating or updating a relative atlas based upon observations collected by a single vehicle in a new geographical area (i.e., a geographical area that has not yet been incorporated into a relative atlas). The sequence of operations may be performed by the vehicle (autonomous or otherwise) collecting the observations, by an autonomous vehicle (whether or not that autonomous vehicle collected the observations), by another computer system that is separate from any vehicle (e.g., a cloud-based service such as remote vehicle service 178 of FIG. 1), or some combination thereof. Moreover, the sequence may be performed "online" (i.e., as observations are collected) or may be performed as an offline or batch process in different implementations. Moreover, while in some implementations the sequence of operations may be fully automated, in other implementations some steps may be performed and/or guided through human intervention. Furthermore, it will be appreciated that the order of operations in the sequence may be varied, and that some operations may be performed in parallel and/or iteratively in some implementations, so the sequence illustrated in FIG. 15 is merely an illustrative example.

The sequence begins in block 502 by receiving a vehicle log including observations collected during the vehicle's travel through the new geographical area. In this regard, a vehicle log may be considered to represent any set of observations collected from one or more vehicles and/or other data sources, whether at the same or different times. A vehicle log may incorporate multiples files, data structures, etc., and may be distributed over multiple locations in some implementations.

Block 504 next initializes a subgraph, e.g., by initializing a data structure that will be used to store and organize the nodes and edges of a subgraph that will be created based upon the observations in the vehicle log. Block 506 next creates one or more tiles to represent the geographical area. As noted above, the tiles may be overlapping in some implementations, and in some implementations tiles may be defined with standard dimensions such that the number of tiles to be created depends upon the size of the geographical area, while the layout of the tiles is predefined according to some regular spacing.

In creating the tiles in block 506, corresponding tile nodes may be constructed and incorporated into the subgraph, and appropriate tile-and-ECEF edges may be constructed and incorporated into the subgraph to define the relative poses between each new tile and the global reference point.

In addition, in some implementations, payload data may be added to each tile node to incorporate knowledge about the geographical area represented by each tile either based on collected observations or based on other information. For example, it may be desirable in some implementations to incorporate a surface model of the geographical area represented by a tile as the payload of the corresponding tile node. As will become more apparent below, the surface model may be used by a localization system to determine a current pose of a vehicle within a tile, e.g., by comparing a point cloud of sensor observations from the vehicle against the stored surface model for the tile. The surface model may be derived from sensor data in a vehicle log (e.g., LIDAR, RADAR and/or image data) and/or may be derived from overhead satellite observations or other mapping data sources, and may be represented in a number of manners as will be appreciated by those of ordinary skill having the benefit of the instant disclosure.

Next, in block 508, gates are created for the geographical area based upon the traversed path of the vehicle during collection of observations, and transformations between nearby gates as well as between gates and tiles are determined. For example, gates may be determined at predetermined intervals along the path followed by the vehicle as the vehicle travels through the geographical area. Gate nodes corresponding to the new gates are constructed and incorporated into the subgraph, and gate-and-gate and tile-and-gate edges are constructed and incorporated into the subgraph, with the determined transformations stored in the transformation fields of the edges. Payload data may also be incorporated into the gate nodes and/or edges as appropriate, e.g., to add speed limits, to define conditions under which gate-to-gate transitions are permitted, etc.

Next, in block 510, boundaries are created for the geographical area based upon observations in the vehicle log, e.g., based upon image processing of camera, LIDAR and/or RADAR data, and transformations between nearby gates and boundaries, as well as between boundaries and tiles are determined. Boundary nodes corresponding to the new boundaries are constructed and incorporated into the subgraph, and boundary-and-boundary, boundary-and-gate and tile-and-boundary edges are constructed and incorporated into the subgraph, with the determined transformations stored in the transformation fields of the edges. Payload data may also be incorporated into the boundary nodes and/or edges as appropriate, e.g., to define the type of boundary, the conditions (if any) under which a boundary may be crossed, etc.

Next, in blocks 512 and 514 traffic controls that regulate one or more roadways and incorporated into the subgraph. In block 512, traffic devices are created for the geographical area based upon observations in the vehicle log, e.g., based upon image processing of camera, LIDAR and/or RADAR data, and transformations defining relative poses between the traffic devices and one or more tiles are determined. Traffic device nodes corresponding to the new traffic devices are constructed and incorporated into the subgraph, and tile-and-traffic-device edges are constructed and incorporated into the subgraph, with the determined transformations stored in the transformation fields of the edges. Payload data may also be incorporated into the traffic device nodes and/or edges as appropriate, e.g., to define a bounding box to be analyzed when determining traffic device state, to classify the type and/or operation of traffic device (e.g., sign or light, configuration of lights, light sequence, etc.)

Next, in block 514 control and passages may be created to link together traffic devices into logical traffic controls and to establish sets of gates defining various passages through a regulated area, as well as to establish logic for representing the operation of the traffic control. Associated control and passage nodes may be constructed and incorporated into the subgraph along with appropriate traffic-device-and-control, control-and-passage and passage-and-gate edges. Payload data may also be incorporated into the control and passage nodes and associated edges as appropriate, e.g., to define the logic of each traffic control.

Next, in block 516 the newly created subgraph may be merged into an existing relative atlas graph, e.g., into a global relative atlas graph. Further, in block 518, it may be desirable in some implementations to propagate the changes to the relative atlas system, e.g., the new subgraph, to the population of vehicles that use the relative atlas system. The propagation may be implemented by deploying a new version of a relative atlas in some instances, while in other instances updates may be propagated as differences to reduce the volume of data required. The propagation may be automatic in some instances, while in other instances the propagation may be on demand. A wide variety of manners of propagating changes to a shared mapping resource such as a relative atlas may be used in different implementations, as will be appreciated by those of ordinary skill having the benefit of the instant disclosure.

The manner in which gates, boundaries, traffic devices, and other elements may be determined from observation data may vary in different embodiments. Individual elements, for example, may be represented in numerous observations, and thus identification and positioning of such elements may include processing of multiple observations. For example, consider a captured video from a vehicle that travels through a geographical area. As that vehicle travels through the geographical area, elements such as boundaries and traffic devices may be observable in every frame of the captured video, so processing may be performed to localize each element based upon the multiple observations, e.g., by triangulating the position of the element for each observation and averaging or otherwise combining the multiple triangulated positions. Moreover, emphasis may be placed on proximity between an element and a location from which an observation pertaining to that element is made, e.g., so that position calculations made for elements from close observations are weighted more heavily than observations collected from further away. It should be noted that in some implementations such emphasis may improve local fidelity for elements laid out around an autonomous vehicle since the relative poses of the elements will have been determined with priority placed on observations collected from a position that is more likely to be near the current position of the autonomous vehicle when those elements are laid out.

In addition, it will be appreciated that relative poses between different elements and/or between various elements and tiles may be encoded into a graph in various manners. As noted above, for example, some elements may be visible from observation points in other tiles, and as such, for these and other reasons edges may be created to link element nodes for some elements to multiple tile nodes to define relative poses between some elements and multiple tiles in the vicinity of the element. Furthermore, relative poses may be determined between all or some of the elements within the same vicinity and encoded into edges so that the relative pose between any two elements may be obtained in multiple ways by traversing through different combinations of nodes and edges in a graph in some implementations. Thus, for example, gate nodes may be connected by edges not only to gate nodes for immediately adjacent gates but also to gate nodes for additional gates that are not directly adjacent but are still within some radius of one another. Likewise, boundary nodes may be connected by edges to nodes corresponding to other boundaries and/or gates within some radius.

Moreover, it will be appreciated that in some implementations it may be desirable to combine observations from multiple vehicles and/or from multiple passes by one or more vehicles through a particular geographical area. Furthermore, it will be appreciated that the mapping performed of a geographical area may be repeatedly updated and refined to adapt to changes in the geographical area or to otherwise better match a relative atlas with recent observations. Therefore, while sequence of operations 500 of FIG. 15 focuses on building a subgraph of a geographical area that has not been previously incorporated into a relative atlas, a more generalized sequence of operations may be performed to handle both the incorporation of new mapping data into a relative atlas as well as the refinement of existing mapping data to incorporate more recent observations.

Figure 16:
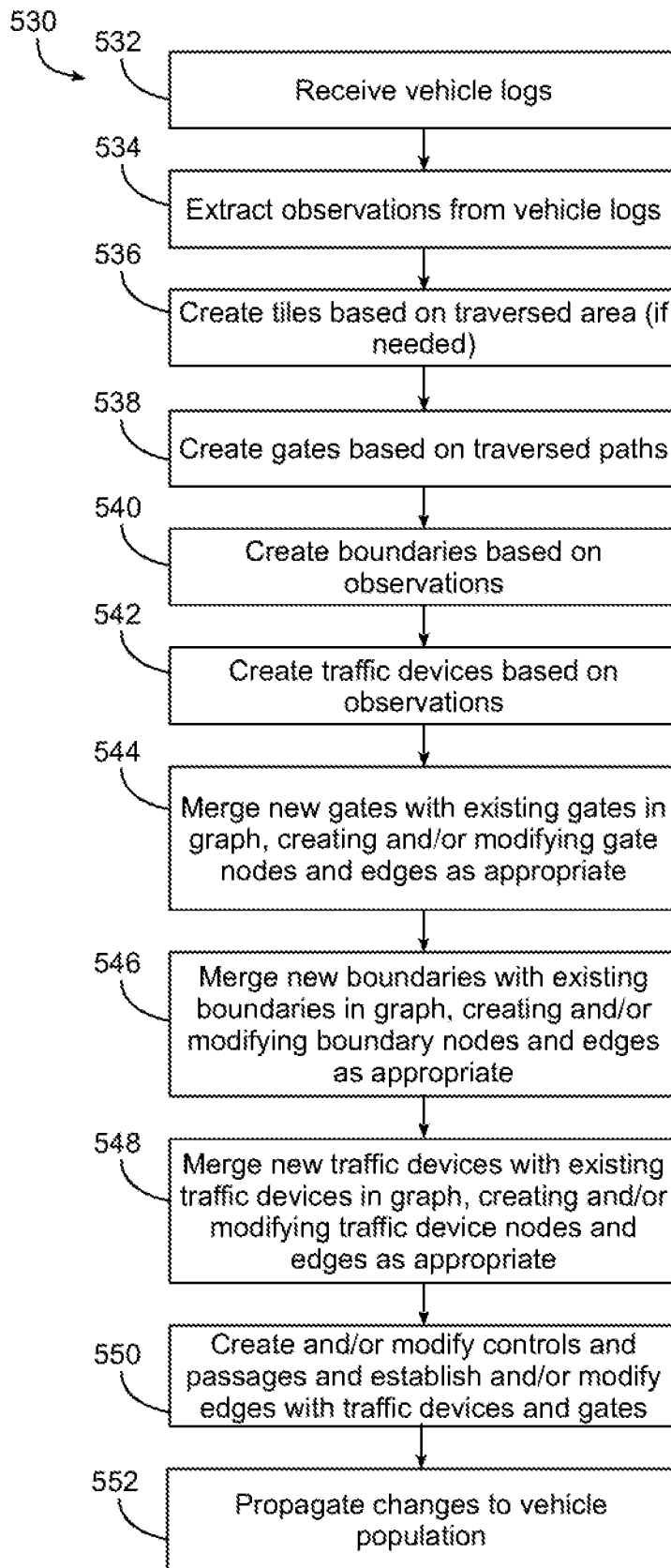
FIG. 16 is a flowchart illustrating another example sequence of operations for incorporating observations into an existing graph for use with the relative atlas system of FIG. 3.

FIG. 16, for example, illustrates a sequence of operations 530 for incorporating new observations into an existing relative atlas graph. The sequence may begin in block 532 by receiving vehicle logs from multiple vehicles. Block 534 may extract observations from the vehicle logs, and block 536 may create one or more tiles as needed based upon the traversed geographical area represented by the observations, e.g., based upon whether or not tile nodes for the traversed geographical area already exist.

Next, block 538 may create gates based upon traversed paths from the vehicle logs and blocks 540 and 542 may create boundaries and traffic devices based upon observations from the vehicle logs, similar to the corresponding operations described above in connection with blocks 508-512 of FIG. 15. In some implementations, a subgraph may be created to correspond to the created gates, boundaries and traffic devices, while in other implementations the created gates, boundaries and traffic devices, and the relative positions determined therefor, may be maintained in other appropriate manners.

Blocks 544-548 next incorporate the gates, boundaries and traffic devices created in blocks 538-542 into an existing relative atlas graph. Block 544 for example, merges any new gates with the existing gates in the relative atlas graph, and may either create new gate nodes and edges in the relative atlas graph or modify existing gate nodes and edges as appropriate. In some implementations, for example, the existing relative atlas graph may be queried to find a gate node potentially matching each created gate, and if no such gate node is found, a new gate node, as well as edges connecting that gate node to one or more tile nodes and/or one or more adjacent gate nodes and/or boundary nodes may be added to the relative atlas graph.

If, on the other hand, a matching gate node is found, that gate node and/or any edges defining relative poses between the corresponding gate and other elements and/or tiles may be modified to reflect the more recent observations. Various mapping techniques for refining map elements may be used in different implementations to appropriately give deference to prior observations encoded into existing nodes and edges while still enabling refinements to occur when newer observations do not match with the prior observations, as will be appreciated by those of ordinary skill having the benefit of the instant disclosure.

It will be appreciated, however, that mismatches between prior and newer observations in a relative atlas graph consistent with the invention generally do not necessitate graph-wide adjustments to be made. Thus, for example, in contrast with an absolute positioning approach where positional updates may need to be propagated to all of the mapped elements throughout an entire geographical area if it is determined that prior positioning was incorrect, in the illustrated implementations positional adjustments to individual elements may only require updates to be made in the relative pose transformations of the edges connected directly to the element nodes of any adjusted elements.

Blocks 546 and 548 employ similar techniques as discussed above in connection with block 544 in order to merge new boundaries and traffic devices into the existing relative atlas graph such that new boundary and traffic device nodes and edges are created and/or existing boundary and traffic device nodes and edges are modified as appropriate. Block 550 next creates and/or modifies controls and passages by creating new and/or modifying existing control and passage nodes and creating new and/or modifying existing edges with traffic devices and gates. Thereafter, in block 552, it may be desirable in some implementations to propagate the changes to the relative atlas system, e.g., the new subgraph, to the population of vehicles that use the relative atlas system. The sequence of operations is then complete.

Figure 17:
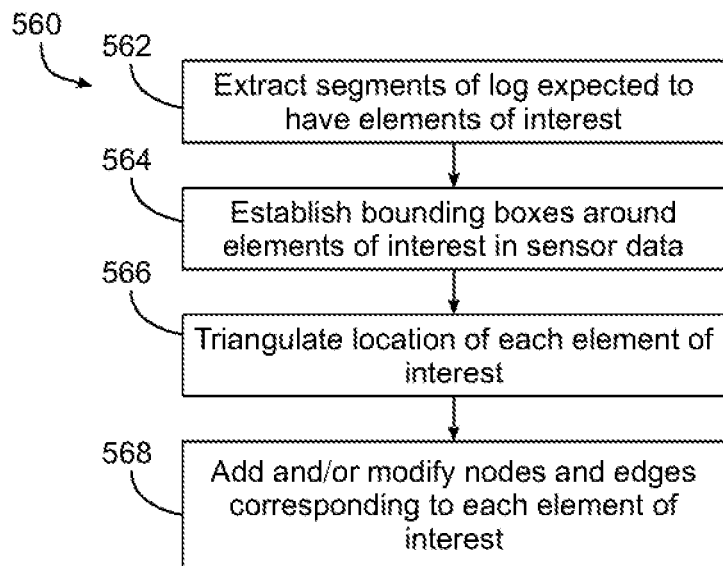
FIG. 17 is a flowchart illustrating an example sequence of operations for importing elements into a graph for use with the relative atlas system of FIG. 3.

Now turning to FIG. 17, as discussed above elements may be detected from observations collected from a geographical area and used to generate element nodes and edges in a relative atlas graph. FIG. 17 illustrates an example generalized sequence of operations 560 that may be used to import various types of elements of interest into a relative atlas graph, e.g., as is generally performed in sequences 500, 530 discussed above. In sequence 560, segments of a vehicle log expected to have elements of interest may be extracted from the vehicle log in block 562, and bounding boxes may established around elements of interest in the sensor data from the vehicle log in block 564. The bounding boxes may be established automatically in some implementations, e.g., based upon image processing of sensor data, or may be performed with human assistance, e.g., based upon manual entry of bounding boxes by a human viewing the sensor data. Next, in block 566 the location of each element of interest is triangulated, e.g., based upon multiple observations in the sensor data (e.g., based upon distances captured in multiple frames and from multiple vantage points). Then, in block 568 relative poses with surrounding elements and tiles are determined and associated element nodes and edges are created and/or modified as appropriate for each element of interest.

A practical but non-limiting example of sequence of operations 560 relates to the acquisition of traffic devices from image captures from a vehicle-mounted camera. In one implementation of sequence of operations 560, segments of a video file in a vehicle log that are expected to include traffic lights may be extracted and bounding boxes may be manually or automatically (e.g., using pattern recognition) generated around each traffic device that is visible in each image. Positional data regarding the position of the vehicle when each snapshot image was captured and the relative distance to each traffic device may be compiled and used to triangulate a position of the traffic device, including a height above a road surface, in a manner that is well within the abilities of those of ordinary skill having the benefit of the instant disclosure. For example, camera calibration data and log localization data may be used to determine a position of a bounding box within some common reference frame (e.g., a tile). Nodes corresponding to each traffic device may then be modified (if found to match an existing traffic device node) or created (if no match was found) and edges may be created or modified as needed to establish relative poses with nearby tiles and other elements.

Other applications and variations of sequence of operation 560 will be appreciated by those of ordinary skill having the benefit of the instant disclosure, and therefore the invention is not limited to the particular sequence discussed herein.

Figure 18:
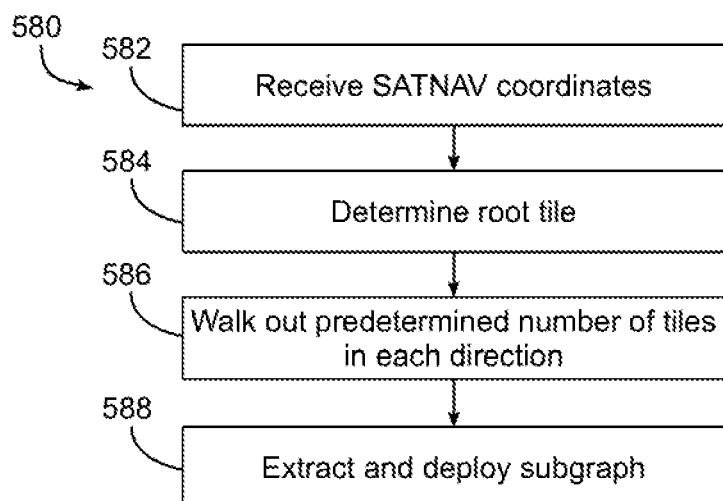
FIG. 18 is a flowchart illustrating an example sequence of operations for deploying a subgraph for use with the relative atlas system of FIG. 3.

Now turning to FIG. 18, this figure illustrates an example sequence of operations 580 for deploying a subgraph to an autonomous vehicle. Sequence of operations 580 may be performed, for example, at initial start-up of an autonomous vehicle, or alternatively, when it is determined that the autonomous vehicle has entered a geographical area that extends beyond the extents of the local copy of the relative atlas cached in the autonomous vehicle. Sequence of operations 580 may also be performed when updating a portion of a relative atlas graph.

The sequence begins in block 582 by receiving SATNAV coordinates for a vehicle, which provides a rough estimate of the current position of the vehicle. Alternatively, in other implementations the current position may be based on manual entry by a human operator (e.g., entering a postal code, latitude/longitude, city and state, and/or street address, etc.), or in other appropriate manners. Then, in block 584, a root tile is determined for the vehicle, e.g., based upon which tile most closely approximates the current position of the vehicle. The root tile may be determined, for example, by walking a relative atlas graph from the ECEF node, or by walking from tile node to tile node to locate a tile that overlaps the current position of the vehicle. Then, in block 586, the root tile is used as a center position and the relative atlas graph may be walked out a predetermined number of tiles in each direction from the center position to determine a set of tiles to be deployed to the vehicle. For example, all of the tiles within X kilometers of the root tile may be incorporated into the set of tiles to be deployed in some implementations. Then, in block 588, a subgraph may be extracted from the relative atlas graph and deployed to the vehicle, e.g., downloaded as a different file or a complete data structure. In some implementations, the subgraph may include all of the tile nodes and edges coupling the tile nodes to the ECEF nodes, along with all element nodes and edges connected to the tile nodes, or at least the element nodes within a predetermined number of nodes or steps from the selected tile nodes. Of note, in the illustrated implementation, this extraction may be implemented using database queries to retrieve sets of node records and edge records from the node and edge tables in the master relational database for a relative atlas graph, and deployment may include simply adding the extracted records to the local node and edge tables in a local relationship database in the vehicle.

Figure 19:
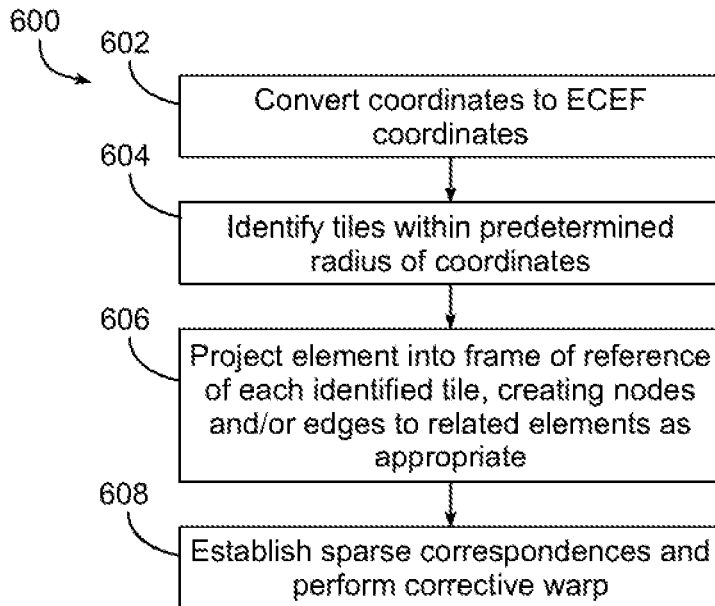
FIG. 19 is a flowchart illustrating an example sequence of operations for importing external data into a graph for use with the relative atlas system of FIG. 3.

Now turning to FIG. 19, this figure illustrates an example sequence of operations 600 for importing external data into a relative atlas graph. The external data, for example, may include mapping data collected from an external data source, e.g., satellite imagery, construction schedules and/or roadway changes, locations for street addresses ("front door"), congestion models, named locations of interest, closure schedules, etc. The external data may be localized, e.g., using SATNAV coordinates, and as such, the sequence of operations may begin in block 602 by converting the coordinates of the external data into ECEF coordinates to generate a rough correspondence with the frame of reference used for the relative atlas graph. Block 604 then identifies one or more tiles within a predetermined radius of the coordinates, and block 606 may then project one or more elements represented by the external data into the frame of reference of each identified tile within the predetermined radius. The projection may be based upon, for example, applying the transformation from the tile-and-ECEF edge to the ECEF-based coordinates of the element(s) in the external data.

Block 606 may also create one or more nodes and/or edges for the elements in the external data as appropriate, or alternatively add to or modify data in one or more existing nodes and/or edges. Where elements in external data represent new elements from the perspective of the relative atlas system, for example, new element nodes may be added and new edges may be added to connect the new element nodes to the existing relative atlas graph. On the other hand, where elements in the external data correspond to elements that already exist in the relative atlas graph, the existing element nodes and/or edges connected thereto may be modified as appropriate. For example, where external data provides construction-related information about a geographical area, the nodes for existing gates may be modified to incorporate payload data that describes how construction may alter vehicle travel through the gate (e.g., a reduced speed limit, a lane closure, etc.), whereby no new nodes or edges would generally be required.

Next, as illustrated in block 608, a corrective warp may be performed in some instances to more accurately place external data into a relative atlas graph, although in other instances no corrective warp may be performed. Elements from the external data that are spatial in nature, for example, may incorporate some degree of positioning and/or scaling error given that they are generated outside of a relative atlas system, and as such, it may be desirable to overlay a set of elements into the relative atlas graph and attempt to establish sparse correspondences with existing elements in the relative atlas graph. The sparse correspondences may then be used to generate a non-rigid transformation for the overall set of new elements and apply a corrective warp to that set of elements, and thereby adjust the relative positions of the elements in the set of elements to better fit within the frame of reference of the relative atlas graph.

It will be appreciated that in general, a relative atlas system may incorporate data from a wide variety of sources, including autonomous vehicles, non-autonomous vehicles and various external data sources, and build a relative atlas graph that defines the relative poses between elements in one or more geographical areas along with other mapping data that assists with performing many of the operational functions associated with controlling an autonomous vehicle. Furthermore, given the dynamic nature of the real world and the fact that autonomous vehicles operating within a geographical area may be able to continually provide new mapping data associated with the geographical area, a relative atlas system may be continually refined and adapted over time to mirror changes occurring within the geographical area. Further, by virtue of establishing relative poses between elements, local fidelity may be optimized as relative poses between elements in proximity to one another as well as to the sensors from which the relative poses are determined (e.g., vehicle-mounted sensors).

Other variations for generating and updating a relative atlas may be used in other implementations, and will be appreciated by those of ordinary skill having the benefit of the instant disclosure. Therefore, the invention is not limited to the specific sequences of operation discussed herein.

Relative Atlas Usage

As noted above, a relative atlas system may be utilized by a number of control subsystems of an autonomous vehicle in connection with controlling the operation thereof. In particular, through the use of relative poses defined between elements represented in the relative atlas system, various elements may be laid out in various types of digital maps suitable for use in controlling an autonomous vehicle, and in a manner that generally emphasizes local fidelity proximate the vehicle. In general, elements may be laid out in a digital map by accessing a relative atlas to identify elements in a geographical area proximate a vehicle, accessing the relative atlas to determine relative poses between the identified elements, and then laying out the identified elements within the digital map using the determined relative poses.

Further, in many instances, where a digital atlas graph is used, elements may be laid out in a digital map by walking between element nodes and laying out elements based upon the relative poses or transformation functions defined in the edges connecting the element nodes. Thus, for example, given the position or pose of one element laid out in a digital map, the position or pose of another element may be determined from the position or pose of the former element using the relative pose defined by the edge connecting together the two element nodes corresponding to the two elements.

Figure 20:
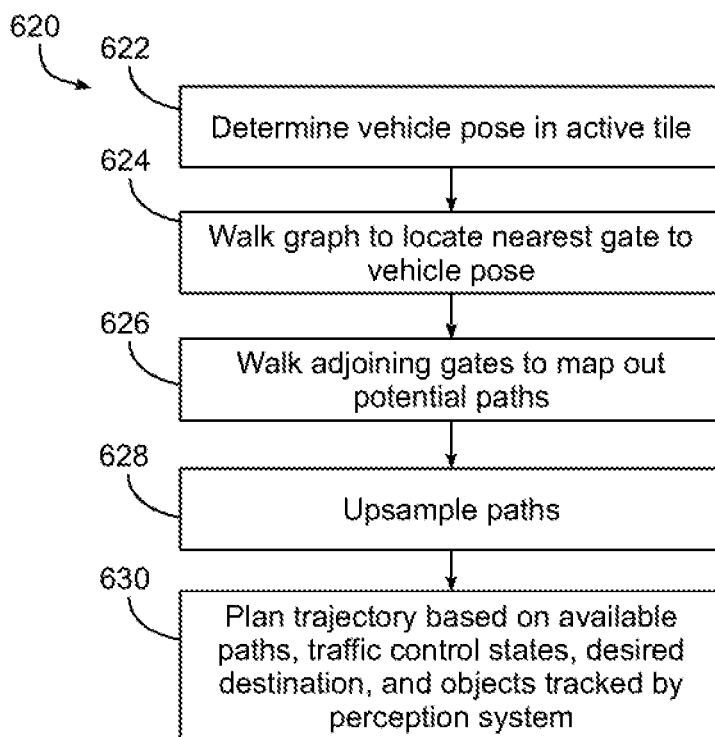
FIG. 20 is a flowchart illustrating an example sequence of operations for planning a vehicle trajectory with the relative atlas system of FIG. 3.

The herein-described techniques, as noted above, may be used to generate digital maps suitable for use in connection with various types of operations associated with the control of an autonomous vehicle. FIG. 20, for example, illustrates an example sequence of operations 620 for planning a vehicle trajectory, e.g., using primary vehicle control system 120 of FIG. 2, and which utilizes a digital map that maps out the potential paths that a vehicle may take when planning a trajectory for the vehicle. It will be appreciated that at least some of the operations performed in sequence 620 may be performed remotely from an autonomous vehicle (e.g., in a remote vehicle service such as remote vehicle service 178 of FIG. 1), although in many implementations it may be desirable to localize the operations in sequence 620 to an autonomous vehicle so that control over an autonomous vehicle is not dependent upon connectivity with any system external to the autonomous vehicle.

Sequence 620 may be used, for example, as a primary control loop for an autonomous vehicle, and may be executed numerous times per second (e.g., 5-10 times a second or more) in order to continually refresh a planned trajectory for a vehicle over some future time frame (e.g., for the next 20 seconds). In some implementations, a controlled stop trajectory may also be continually generated and refreshed in order to enable a controlled stop to be performed should an adverse event happen with the autonomous vehicle or any of its control systems.

Sequence 620 may begin in block 622 by determining a vehicle pose in an active tile. In particular, in this implementation, it is assumed that at any given instance there is a single tile designated as the active tile that starts as the base frame of reference from which the creation of a digital map of the immediate vicinity of the autonomous vehicle is created and from which the position and orientation (i.e., the pose) of the vehicle within that digital map is established. The active tile may change as the vehicle moves throughout a geographical area, and logic may be used to dynamically switch to a different active tile within sequence 620 may be incorporated into some implementations, as will become more apparent below.

Once the vehicle pose in the frame of reference of the active tile is established (in a process that will be described in greater detail below in connection with FIGS. 22-23), block 624 the relative atlas graph is "walked" (i.e., edges between nodes are traversed to move from node to node) to locate the nearest gate to the current vehicle pose, e.g., based upon the gate having the relative pose that most closely matches the relative pose of the vehicle within the tile. In some implementations, for example, the transformations for all of the gate nodes connected to the active tile (i.e., as stored in the tile-and-gate edges connected to the tile) may be analyzed to find a transformation that references a position closest to the current vehicle pose.

Once the nearest gate is located, block 626 may then walk outwardly from the nearest gate through the gate nodes and gate-to-gate edges of some or all adjoining gates to map out potential paths for the vehicle. It should be noted that in mapping out the potential paths, the relative poses defined by the transformations in the edges connecting together gate nodes may be used to place each gate within a map surrounding the vehicle pose, and in many implementations without concern for the frame of reference of the active tile, or for any global frame of reference.

Figure 21:
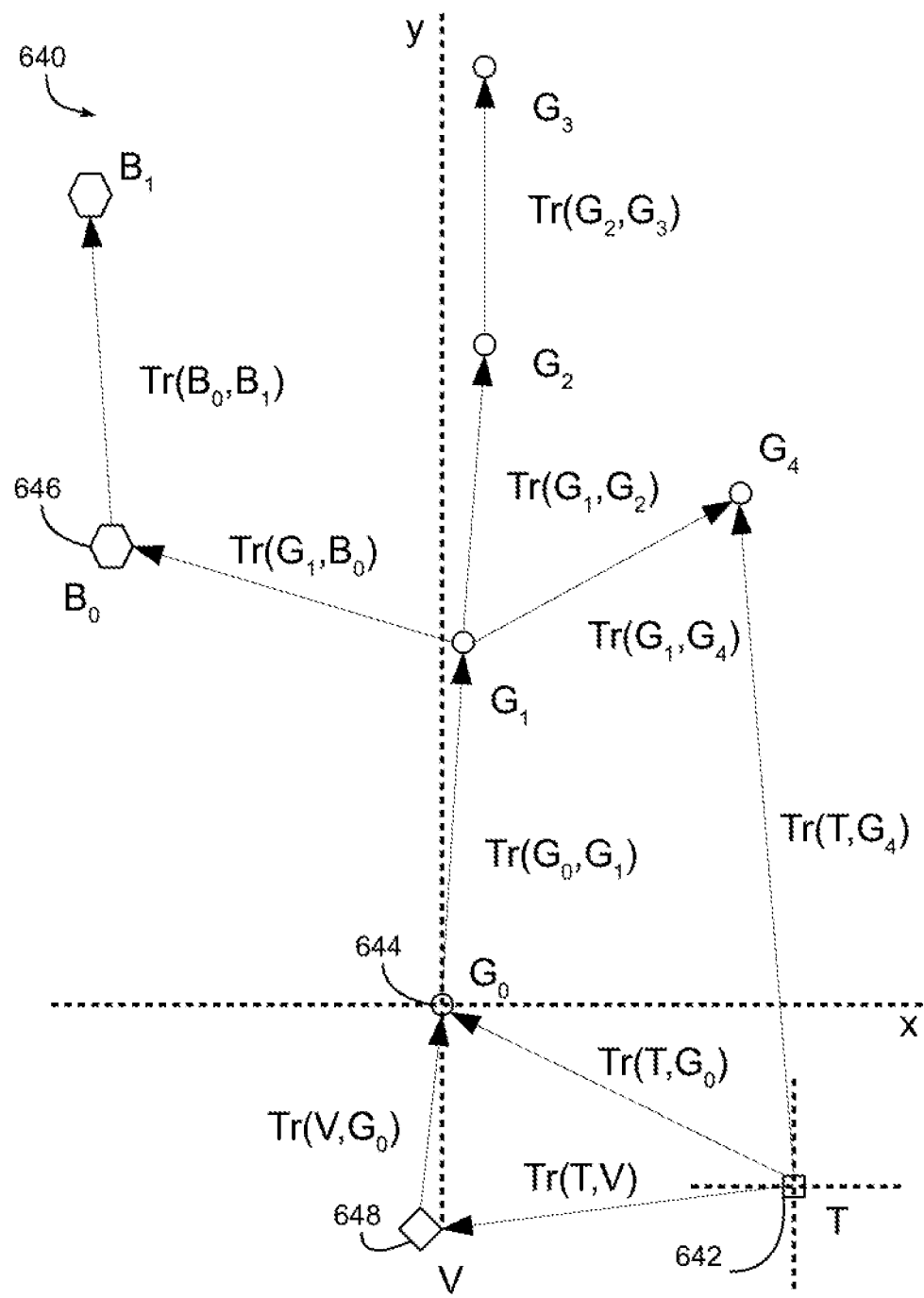
FIG. 21 is a functional top plan view of a portion of an example digital map generated by the relative atlas system of FIG. 3.

FIG. 21, for example, illustrates a portion of an example two-dimensional digital map 640 that may be constructed using blocks 622-626 of FIG. 20. The use of a two-dimensional digital map is merely to simplify the explanation, and it will be appreciated that in many implementations a three-dimensional digital map may be constructed. In this figure, an origin 642 of a frame of reference for a tile T is illustrated, along with various gates 644 (separately denoted as gates $G_0$-$G_4$) and boundaries 646 (separately denoted as boundaries $B_0$ and $B_1$). Assume, for example, that in block 622 tile T is identified as the active tile and a vehicle pose V having a transformation function Tr(T,V) is determined at the location identified at position 648. Block 624 may walk the relative atlas graph to identify which among the various gates is nearest to the vehicle pose, e.g., by analyzing the relative poses of the gates connected to the tile. By doing so, gate $G_0$, having a transformation function Tr(T,$G_0$) may be determined to be the nearest to the vehicle pose, and a transformation function Tr(V,$G_0$) may be determined to determine the relative pose of the vehicle within the frame of reference of gate $G_0$.

In some implementations, for example, the nearest gate, here gate $G_0$, may be used as the frame of reference for the digital map created from the relative atlas graph (as represented by the x and y axes illustrated in FIG. 21), such that all elements are laid out in the digital map relative to the nearest gate. In other implementations, however, the vehicle pose may be used as the frame of reference, whereby all elements laid out in the digital map relative to the vehicle pose. In still other implementations, other frames of reference may be used.

Once the frame of reference is established, block 626 may walk outwardly from the nearest gate to lay out other elements that are proximate to the nearest gate. Thus, for example, a next joint gate $G_1$ may be positioning in the digital map by applying a transformation Tr($G_0$,$G_1$) stored in a gate-to-gate(joint) edge connecting the nodes for gates $G_0$ and $G_1$. Assuming gate $G_1$ is connected to gates $G_2$ and $G_4$, these gates may be positioned in the digital map by applying transformations Tr($G_1$,$G_2$) and Tr($G_1$,$G_4$) stored in the edges connecting the nodes for gates $G_2$ and $G_4$ to the node for gate $G_1$. The transformations may be applied from the position calculated for gate $G_1$, or alternatively, by applying each transformation in combination with applying transformation Tr($G_0$,$G_1$) to the origin position of gate $G_0$ (which is functionally equivalent).

Similarly, gate $G_1$ is connected to a boundary $B_0$, which is in turn connected to a boundary $B_1$, while gate $G_2$ is also connected to another gate $G_3$. For each of these other elements, transformations are stored in the edges connecting their corresponding nodes such that, for example, boundary $B_0$ may be positioned by applying transformations Tr($G_0$, $G_1$) and Tr($G_1$,$B_0$), boundary $B_1$ may be positioned by applying transformations Tr($G_0$, $G_1$), Tr($G_1$,$B_0$), and Tr($B_0$, $B_1$), and gate $G_3$ may be positioned by applying transformations Tr($G_0$, $G_1$), Tr($G_1$,$G_2$), and Tr($G_2$,$G_3$).

It should be noted that each gate and boundary may also have tile-and-gate or tile-and-boundary edges connected to tile T, and that each such edge may include an appropriate transformation defining the relative pose of the corresponding gate or edge within the tile's frame of reference (e.g., as is the case with transformation Tr(T,$G_4$) illustrated for gate $G_4$ in FIG. 21.) While transformations between elements and tiles may be used to lay out elements in some implementations and/or instances, it will be appreciated that the herein-described implementation may predominantly lay out elements based on the relative poses and transformations between the elements themselves, rather than to any common or absolute frame of reference. By doing so, local fidelity may be optimized because the relative poses between elements that are closest to one another need not be globally consistent, so as long as the nearby elements are positioned accurately with respect to one another. The fact some error may exist in a set of closely-positioned elements relative to any global or absolute frame of reference is more or less immaterial to many of the aspects of autonomous vehicle control because those aspects are most concerned with the locations of elements relative to the vehicle itself over a relatively short time frame. Further, even though errors in relative poses may accumulate when performing multiple transformations between elements that are not directly connected to one another but are connected through a chain of other elements, these errors will generally affect the relative positioning of elements that are relatively far away from a vehicle, and thus of lesser importance to an autonomous vehicle control system. Put in layman's terms, ensuring that a physical boundary can be known to be precisely 0.4576 meters away from a vehicle is generally more relevant to the control of an autonomous vehicle than whether another physical boundary is either 200 or 202 meters from the vehicle.

Nonetheless, it will also be appreciated that the herein-described relative atlas graph architecture supports multiple manners of layout. The relative poses of some elements may be determined using multiple different combinations of transformations due to the highly interconnected nature of gates, boundaries, tiles and other nodes, and as such, the herein-described architecture may be used in connection with numerous different layout strategies. All elements, for example, are ultimately connected to a single frame of reference (e.g., an ECEF node), so different layout strategies may determine poses through transformations between tiles and the ECEF node, between different tiles, between elements and tiles, between elements of the same type, and/or between elements of different types, and any combination therebetween. Thus, the invention is not limited to the specific layout strategies discussed herein.

Now returning to block 626 of FIG. 20, in mapping out potential paths, boundaries laid out in the digital map may also be considered to ensure that all potential paths do not violate any physical or logical restrictions. Further, the different types of edges between gates may be used to distinguish, for example, between paths extending along the same lane and paths representing lane changes, turns, ramp exits, ramp entrances, etc. The potential paths mapped out in block 626 may therefore represent a set of trajectories a vehicle may be permitted to follow within a particular time frame.

In some implementations, each gate may include both a position and an orientation representative of an allowable vehicle position and orientation when passing through the gate. However, gates may be separated from one another by about 3 to about 10 meters in some implementations to appropriately limit the number of gates needed to represent the paths within a geographical area. Thus, once a set of potential paths has been mapped out, block 628 may be executed to upsample the paths and thereby increase the resolution of the paths. In some implementations, for example, the positions and orientations of gates may be mapped out, curves may be fit between adjacent gates to match the positions and orientations of the gates, and additional points (including associated positions and orientations) may be added along each of the curves. In other implementations, however, no upsampling may be performed.

Next, block 630 plans a trajectory for the autonomous vehicle based upon the available paths, as well as additional information such as the desired destination of the vehicle, traffic information, the states of traffic controls, as well as the various dynamic objects in the vicinity of the vehicle (e.g., as may be tracked by the perception subsystem). In some implementations, for example, different paths may assigned weights or costs so that, for example, travel within the same lane is biased over lane changes, travel on the same street or road is biased over turning onto a different street or road, travel along shorter and/or faster paths is biased over travel along longer and/or slower paths, etc. Moreover, control over vehicle speed, e.g., to stop at a stop sign or red traffic light, to yield to oncoming traffic, to avoid a pedestrian or other vehicle, etc. may also be incorporated into the trajectory as appropriate. Upon completion of block 630 therefore a trajectory for the vehicle over the immediate future is determined, and may be passed, for example, as a sequence of trajectory commands to control subsystem 158 of FIG. 1 to enable the control subsystem to implement the trajectory using the vehicle controls.

Figure 22:
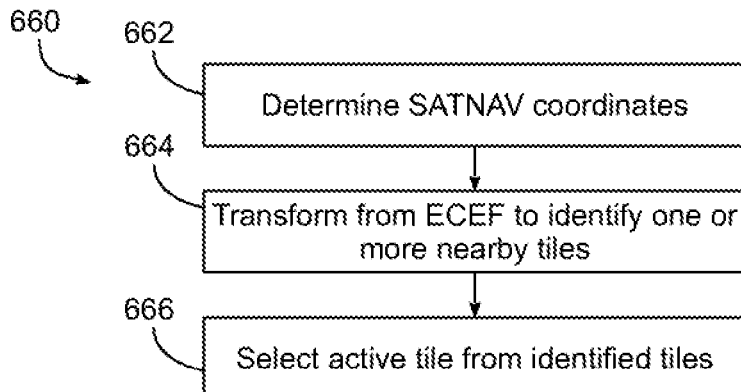
FIG. 22 is a flowchart illustrating an example sequence of operations for bootstrapping the localization subsystem referenced in FIG. 2.
Figure 23:
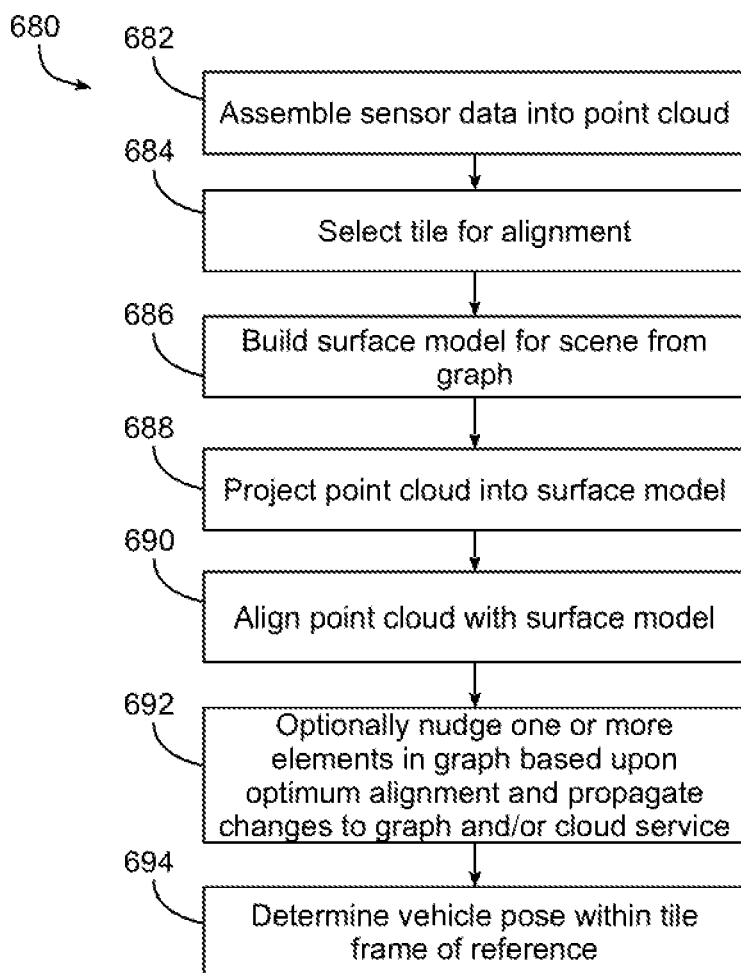
FIG. 23 is a flowchart illustrating an example sequence of operations for determining a vehicle pose with the relative atlas system of FIG. 3.

Now turning to FIGS. 22-23, these figures illustrate two sequences of operation 660, 680 that may be used to determine a vehicle pose, e.g., as discussed above in connection with block 622 of FIG. 20. Sequence 660, in particular, performs a bootstrap operation to select an active tile from which to determine a vehicle pose. As such, sequence 660 may not be executed within a primary control loop that repeatedly calculates a vehicle trajectory, but may be executed upon vehicle startup or any time the vehicle has not been localized to a particular tile. Sequence 660, for example, may be correspond to the bootstrap functionality 206 of the localization subsystem 152 of FIG. 2.

Sequence 660 may begin in block 662 by determining SATNAV coordinates for the vehicle, e.g., based upon SATNAV sensor 132 of FIG. 1. Next, in block 664 the SATNAV coordinates are transformed from the ECEF node to identify one or more nearby tiles in the relative atlas graph. From the identified tiles, block 666 then selects one of the tile to be the active tile against which vehicle pose determinations may be made. The active tile, for example, may be selected as the tile have a center that is nearest to the SATNAV coordinates for the vehicle, although other factors, e.g., whether the vehicle is more likely to be in another adjacent tile based upon the elements connected to the adjacent tile (e.g., if the closest tile does not include any gates in the area corresponding to the vehicle coordinates but the adjacent tile does), may be used to select an active tile in other implementations.

Sequence 680 of FIG. 23 may be executed in the primary control loop for the vehicle, e.g., in block 622 of FIG. 20, and may correspond generally to the map pose functionality 200 of the localization subsystem 152 of FIG. 2. In this implementation, it is assumed that each tile node includes as payload data a surface model of the geographical area represented by the tile. The surface model may be generated, for example, by collecting sensor data (e.g., LIDAR data) from vehicle logs and assembling together measurements collected from different poses as vehicles travel through the tile. Various manners of storing geometry data representative of a surface model may be used in different implementations, and may balance storage space with resolution such that a resulting surface model is sufficiently descriptive to enable a vehicle to be aligned within a specific location in the tile. In addition, in some implementations, geometry data representative of a surface model may be represented as different nodes in a relative atlas graph, rather than within the payload of a tile node, such that a surface model for a tile may be constructed based at least in part upon geometry data distributed among a plurality of nodes in the relative atlas graph.

Sequence 680 of FIG. 23 therefore begins in block 682 by assembling sensor data (e.g., LIDAR data) into a point cloud to represent the surfaces that are currently visible from the vehicle. Block 684 next selects a tile for alignment. For example, in many instances the active tile selected from sequence 660 of FIG. 22 may be selected. In other instances, however, it may be desirable to incorporate logic that dynamically switches the active tile to different tiles based upon the movement and location of the vehicle (e.g., as the vehicle is approaching a tile boundary).

Block 686 next builds a surface model for the scene from the relative atlas graph, e.g., by accessing the geometry data from the payload data in the tile node corresponding to the active tile. Block 688 then projects the point cloud into the surface model and block 690 aligns the point cloud with the surface model, e.g., to identify a position and orientation of the vehicle that most closely aligns the point cloud with the surface model. It will be appreciated that due to the presence of dynamic or moving objects within the scene, a best fit of the point cloud may not be an identical match with the surface model; however, even in such instances a single pose of the vehicle within the scene can generally be determined.

Next, block 692 is optionally executed to "nudge" one or more elements in the relative atlas graph based upon the optimum alignment from block 690. Thus, for example, if a physical boundary represented in the relative atlas graph is sensed as being 2.3 cm closer than expected, the transformations for the boundary node corresponding to that physical boundary may be modified to adjust the relative pose of the boundary to more accurately reflect the sensor data, e.g., by updating a relative pose for one or more edges connected to the boundary node. The changes made to the graph may also be propagated to a remote/cloud service (e.g., service 178 of FIG. 1) or otherwise to other autonomous vehicles such that the graph evolves over time based upon the sensed observations of autonomous vehicles. It will be appreciated that various controls may be implemented to balance changes to the relative atlas graph with stability, e.g., so that element poses are modified only if changes are sensed by multiple vehicles and/or after multiple trips through the same geographical area.

Block 694 then determines the vehicle pose within the frame of reference of the active (selected) tile, e.g., by determining the position and orientation of the vehicle corresponding to the optimum alignment of the point cloud with the surface model. The sequence is then complete. Of note, in the illustrated implementation, SATNAV data is generally not used in the primary control loop for localization such that the primary control loop is not compromised by any unavailability of a SATNAV-derived position for the vehicle.

Figure 24:
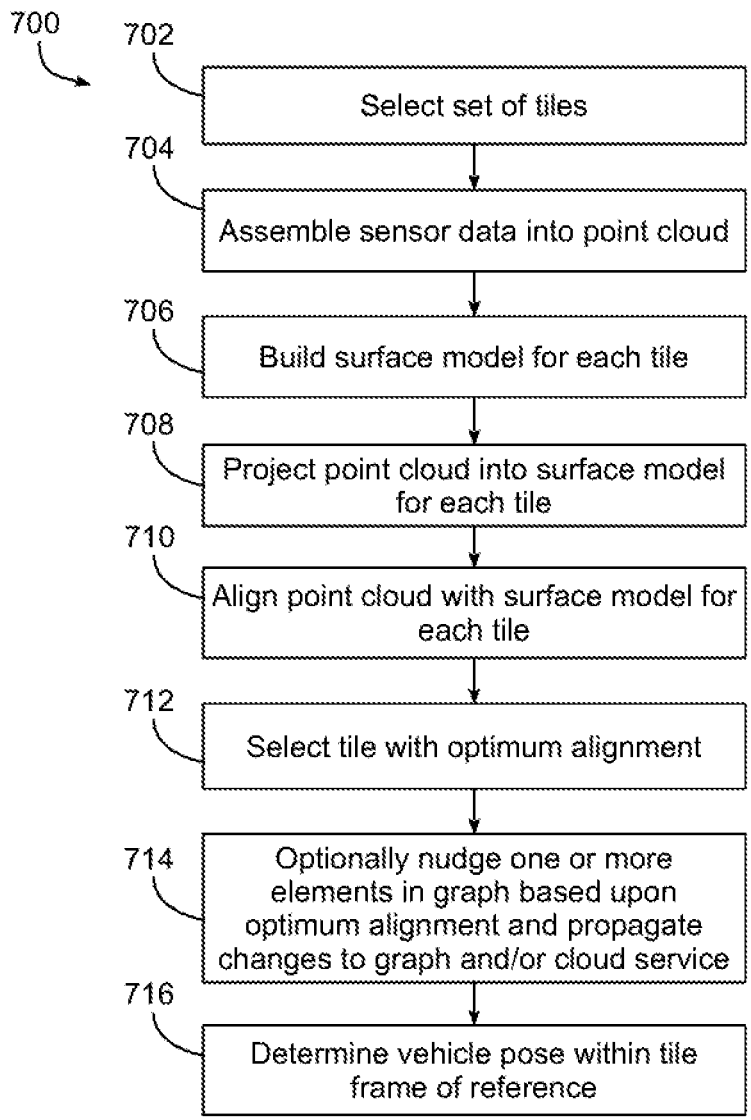
FIG. 24 is a flowchart illustrating another example sequence of operations for determining a vehicle pose with the relative atlas system of FIG. 3.

FIG. 24 illustrates another example sequence of operations 700 for determining a vehicle pose. In sequence 700, rather than selecting a tile and performing an alignment against a surface model for that single tile, surface models may be determined for multiple tiles and alignments may be performed against those multiple surface models to determine an optimum tile to use as the active tile. Thus, sequence 700 may begin in block 702 by selecting a set of tiles against which to perform alignments, e.g., based on a prior active tile and any tiles neighboring that tile. Next, block 704 may assemble sensor data into a point cloud similar to block 682 of FIG. 23, and block 706 may build a surface model for each tile in the set, e.g., using the geometry data stored in the payload of each tile node corresponding to the set of tiles. Block 708 then projects the point cloud into the surface model for each tile and block 710 aligns the point cloud with the surface model for each tile, e.g., to identify a position and orientation of the vehicle that most closely aligns the point cloud with the surface model, similar to blocks 688 and 690 of FIG. 23. Block 712 then selects the tile where the optimum alignment of point cloud and surface model occurs, i.e., where the closest match between point cloud and surface model is found.

Next, block 714 may be optionally executed to "nudge" one or more elements in the relative atlas graph based upon the optimum alignment from block 714, similar to block 692 of FIG. 23. Block 716 then determines the vehicle pose within the frame of reference of the active (selected) tile, e.g., by determining the position and orientation of the vehicle corresponding to the optimum alignment of the point cloud with the surface model. The sequence is then complete.

Other manners of determining a vehicle pose may be used in other implementations. Therefore the invention is not limited to the specific sequences of operations discussed herein.

It will be appreciated that a relative atlas graph consistent with the invention may be used in connection with other aspects of controlling an autonomous vehicle. In some implementations, for example, boundaries may be mapped out and used for vehicle localization and/or planning. In addition, perception subsystem 154 of FIG. 2, for example, may use a relative atlas graph to identify and/or predict the movement of dynamic objects within an environment. For example, the perception system may utilize geometry data and/or other mapping data in a relative atlas graph to distinguish between moving or transitory objects such as vehicles and pedestrians rather than static objects in an environment based upon differences between sensed data and the profiles of the static objects in the relative atlas graph. The perception system may also utilize knowledge of the gates and boundaries within a geographical area to predict the movement of other vehicles within the environment.

Figure 25:
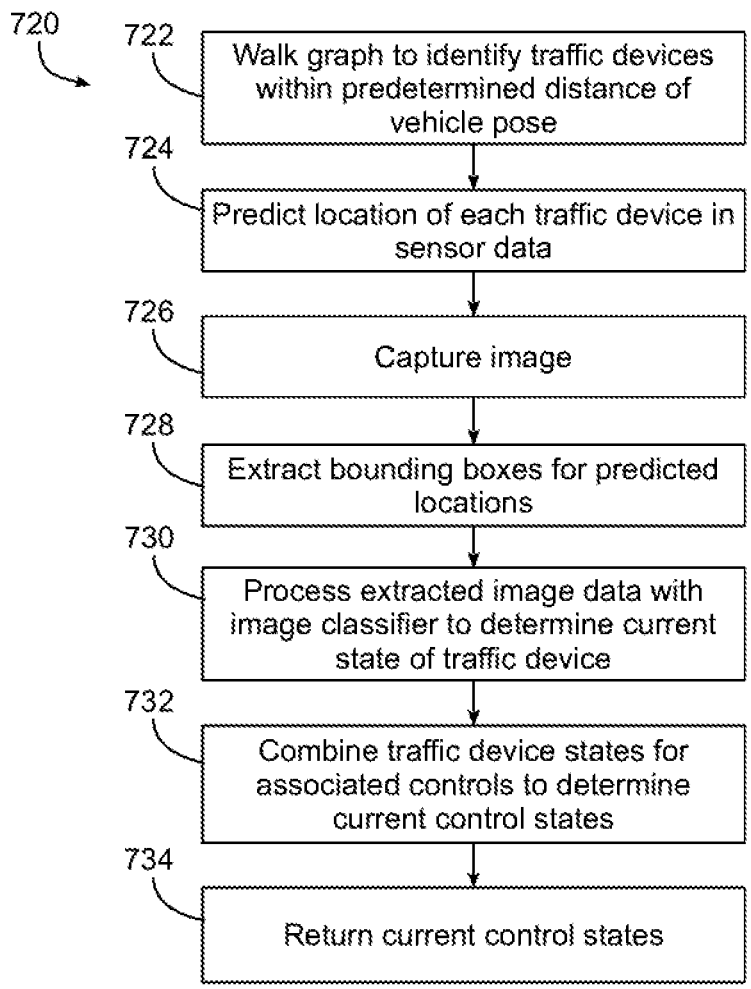
FIG. 25 is a flowchart illustrating an example sequence of operations for determining traffic control states with the relative atlas system of FIG. 3.

Further, as illustrated by sequence of operations 720 of FIG. 25, the perception subsystem (e.g., the traffic device estimation functionality 214 illustrated in FIG. 2) may also utilize a relative atlas graph to estimate the states of traffic controls in a geographical area. For example, sequence 720 may start in block 722 by walking the relative atlas graph to identify traffic devices that are within a predetermined distance (e.g., radius) of the current vehicle pose. As noted above in connection with FIG. 14, it will be appreciated that traffic devices may be visible from several tiles away in some implementations, therefore it may be desirable to evaluate traffic devices if possible within a relatively large area constituting several tiles.

Next, block 724 attempts to predict the location of each traffic device in sensor data, e.g., a location in the field of view of a sensor such as a camera. The prediction may be based, for example, on the current vehicle pose, a transformation stored in a tile-and-traffic-device edge connecting the node for the respective traffic device to a tile, and a calibration-related transformation of the sensor used to collect the sensor data. The transformation in the tile-and-traffic-device edge may also specify an elevation of the traffic device, and in some instances, may define a bounding box within which the traffic device should be visible in the sensor data. As discussed previously, it may be desirable in some implementations to utilize the transformation in the tile-and-traffic-device edge connecting the node for the traffic device to the node for the tile that the vehicle is current located within. It is believed that by doing so, the current pose of the vehicle, and thus the perspective from which the sensor data will be collected, may more closely match the perspective from which the position of the traffic device was originally determined, and thus be more likely to locate the traffic device in the sensor data.

Block 726 then captures an image. For example, in some implementations the state of a traffic device may be determined from an image captured from a camera, so block 726 may capture a still frame image with a camera in some implementations.

Block 728 next extracts bounding boxes for the predicted locations of the various traffic devices from the captured image, and block 730 processes the extracted image data, e.g., using an image classifier, to determine the current state of each traffic device. The state, for example, may specify which light among a plurality of lights is illuminated, or may select from a plurality of states appropriate for a traffic device type encoded in a traffic device node. For example, for traffic device 444 of FIG. 12, the determined state may correspond to "top light illuminated," "red light illuminated," or "traffic stopped" in different implementations.

As noted above, multiple traffic devices linked together as a single traffic control will generally define an overall state for the traffic control, and as such, block 732 may combine the individual states of all of the traffic devices for each control, and thereby determine a corresponding state for each traffic control. The states may then be returned in block 734 and sequence 720 is complete.

Other uses of the mapping data stored in a relative atlas graph will be apparent to those of ordinary skill having the benefit of the instant disclosure. Therefore, the invention is not limited to the particular usages described herein.

It will therefore be appreciated that a relative atlas graph may maintain mapping data that is usable for a number of different operations associated with the control of an autonomous vehicle. Localization, e.g., as represented by localization subsystem 152 of FIG. 2, may utilize tile nodes and the surface geometry stored in the payloads thereof in connection with determining a vehicle pose. Planning, e.g., as represented by planning subsystem 156 of FIG. 2, may utilize element nodes such as gate and/or boundary nodes in connection with planning a trajectory for the vehicle. Similarly, perception subsystem 154 of FIG. 2 may use gate and/or boundary nodes to track over vehicles within an environment, and may use traffic nodes to determine the states of various traffic controls in an environment.

Furthermore, in some instances, some or all of the operations performed by planning and/or perception subsystems 154, 156 may be based upon the positioning of elements in an environment based on relative poses encoded into edges between different element nodes, and without relying on any positioning of elements relative to tiles. Put another way, tile nodes and the transformations encoded into edges between tile nodes and element nodes may not be used to position elements within a digital map in some implementations.

The herein-described relative atlas graph architecture also provides substantial flexibility in terms of layout as well as of identifying aspects of an environment. The bidirectional nature of a node and edge graph architecture, for example, enables queries such as "given a gate, what traffic control affects that gate" as well as "given a traffic control, what gates does this traffic control affect."

Other variations will be apparent to those of ordinary skill. Therefore, the invention lies in the claims hereinafter appended.

What is claimed is:

1. A method of generating mapping data for use by an autonomous vehicle, the method comprising:
   receiving a plurality of observations for a geographical area; and
   generating a relative atlas graph for the geographical area based on the plurality of observations for the geographical area, including:
      generating a plurality of element nodes for a plurality of elements detected from the plurality of observations, each element node having an associated element from the plurality of elements, and each element node having a node type (i) being selected from a plurality of node types and (ii) characterizing the element node;
      generating a plurality of edges, each edge connecting a pair of element nodes from the plurality of element nodes and defining a relative pose between the associated elements for the pair of element nodes, and each edge having an edge type (i) being selected from a plurality of edge types and (ii) characterizing the edge, wherein the relative poses defined by the plurality of edges enhance local fidelity for a digital map generated using the relative atlas graph for an environment surrounding the autonomous vehicle; and
      storing the plurality of element nodes and the plurality of edges in the relative atlas graph.

2. The method of claim 1, wherein each edge includes a transformation field defining the relative pose between the associated elements of the connected pair of element nodes.

3. The method of claim 1, wherein storing the plurality of element nodes and the plurality of edges in the relative atlas graph includes storing the plurality of element nodes as records in a node table and storing the plurality of edges as records in an edge table.

4. The method of claim 3, wherein the node table and the edge table are maintained in a relational database.

5. The method of claim 1, wherein each of the plurality of element nodes includes an identifier field including an identifier for the associated element thereof, and wherein each of the plurality of edges includes first and second identifier fields including identifiers for the associated elements for the pair of element nodes connected thereby.

6. The method of claim 1, wherein each of the plurality of element nodes includes a type field specifying the node type that characterizes the respective element node and wherein each of the plurality of edges includes a type field specifying the edge type that characterizes the respective edge.

7. The method of claim 6, wherein each of the plurality of element nodes includes a payload field including element-specific data, and wherein each of the plurality of edges includes a payload field including edge-specific data.

8. The method of claim 7, wherein the element-specific data in the payload field for a first element node from the plurality of nodes is structured based upon the node type specified in the type field of the first element node, and wherein the edge-specific data in the payload field for a first edge from the plurality of edges is structured based upon the edge type specified in the type field of the first edge.

9. The method of claim 1, wherein the plurality of element nodes includes a plurality of gate nodes, each gate node defining a gate representing a permissible vehicle pose within a geographical area, and wherein generating the plurality of element nodes includes generating the plurality of gate nodes based upon one or more traversed paths in one or more vehicle logs collected by one or more vehicles traversing the geographical area.

10. The method of claim 9, wherein the plurality of edges includes a plurality of gate-and-gate edges connecting pairs of gate nodes from the plurality of gate nodes, each gate-and-gate edge defining a permissible vehicle path between a pair of gates defined by the respective pair of gate nodes, wherein a first gate-and-gate edge from the plurality of gate-and-gate edges connects first and second gate nodes from the plurality of gate nodes that represent a same lane of a roadway, and wherein a second gate-and-gate edge from the plurality of gate-and-gate edges connects third and fourth gate nodes from the plurality of gate nodes that represent different lanes of one or more roadways.

11. The method of claim 9, wherein the plurality of element nodes further includes a plurality of boundary nodes, each boundary node defining a physical or virtual boundary that restricts vehicle movement within a geographical area, and wherein generating the plurality of element nodes includes generating the plurality of boundary nodes based upon observations in one or more vehicle logs collected by one or more vehicles traversing the geographical area.

12. The method of claim 11, wherein the plurality of edges further includes a plurality of boundary-and-boundary edges connecting pairs of boundary nodes from the plurality of boundary nodes, each boundary-and-boundary edge defining a relative pose between a pair of boundaries defined by the respective pair of boundary nodes.

13. The method of claim 12, wherein the plurality of edges further includes a plurality of boundary-and-gate edges, each connecting a gate node from the plurality of gate nodes with a boundary node from the plurality of boundary nodes and defining a relative pose between a gate and boundary respectively defined by the gate node and boundary node connected thereby.

14. The method of claim 1, wherein the plurality of nodes includes a plurality of traffic nodes, each traffic node associated with a traffic control within a geographical area, and wherein generating the plurality of element nodes includes generating the plurality of traffic nodes based upon observations in one or more vehicle logs collected by one or more vehicles traversing the geographical area.

15. The method of claim 14, wherein generating the plurality of traffic nodes includes:
   generating bounding boxes bounding traffic devices detected in images of the geographical area;
   triangulating positions of traffic devices bounded by the bounding boxes within the geographical area; and
   storing relative poses corresponding to the triangulated positions of the traffic devices in edges connected to one or more traffic nodes.

16. The method of claim 14, wherein the plurality of traffic nodes includes a control node defining a traffic control for a regulated geographical area, a plurality of traffic device nodes, each traffic device node defining a traffic device in the regulated geographical area, and a plurality of passage nodes defining passages through the regulated geographical area, and wherein the plurality of edges includes traffic-device-and-control edges connecting the plurality of traffic device nodes to the control node and control-and-passage edges connecting the plurality of passage nodes to the control node.

17. The method of claim 16, wherein the plurality of edges further includes traffic-device-and-tile edges connecting traffic device nodes from the plurality of traffic device nodes to one or more tile nodes from the plurality of nodes and respectively defining relative poses between traffic devices defined by respective traffic nodes and one or more tiles defined by the respective one or more tile nodes.

18. The method of claim 17, wherein the plurality of edges further includes passage-and-gate edges connecting passage nodes from the plurality of passage nodes to one or more gate nodes from the plurality of element nodes to define gates that are controlled by the traffic control.

19. An apparatus, comprising:
a memory;
one or more processors coupled to the memory; and
computer instructions executable by the one or more processors to generate mapping data for use by an autonomous vehicle, the computer instructions configured to generate a relative atlas graph for a geographical area in the memory based on a plurality of observations for the geographical area by:
generating a plurality of element nodes for a plurality of elements detected from the plurality of observations, each element node having an associated element from the plurality of elements, and each element node having a node type (i) being selected from a plurality of node types and (ii) characterizing the element node;
generating a plurality of edges, each edge connecting a pair of element nodes from the plurality of element nodes and defining a relative pose between the associated elements for the pair of element nodes, and each edge having an edge type (i) being selected from a plurality of edge types and (ii) characterizing the edge, wherein the relative poses defined by the plurality of edges enhance local fidelity for a digital map generated using the relative atlas graph for an environment surrounding the autonomous vehicle; and
storing the plurality of element nodes and the plurality of edges in the relative atlas graph.

20. A non-transitory computer readable storage medium storing computer instructions executable by one or more processors to perform a method of generating mapping data for use by an autonomous vehicle, the method comprising:
receiving a plurality of observations for a geographical area; and
generating a relative atlas graph for the geographical area based on the plurality of observations for the geographical area, including:
generating a plurality of element nodes for a plurality of elements detected from the plurality of observations, each element node having an associated element from the plurality of elements, and each element node having a node type (i) being selected from a plurality of node types and (ii) characterizing the element node;
generating a plurality of edges, each edge connecting a pair of element nodes from the plurality of element nodes and defining a relative pose between the associated elements for the pair of element nodes, and each edge having an edge type (i) being selected from a plurality of edge types and (ii) characterizing the edge, wherein the relative poses defined by the plurality of edges enhance local fidelity for a digital map generated using the relative atlas graph for an environment surrounding the autonomous vehicle; and
storing the plurality of element nodes and the plurality of edges in the relative atlas graph.

* * * * *